(12) United States Patent
Wolfe et al.

(10) Patent No.: US 11,971,710 B2
(45) Date of Patent: Apr. 30, 2024

(54) DIGITAL MODEL BASED PLANT OPERATION AND OPTIMIZATION

(71) Applicant: Pani Energy Inc, Victoria (CA)

(72) Inventors: Ben Wolfe, Victoria (CA); Devesh Bharadwaj, Victoria (CA)

(73) Assignee: Pani Energy Inc (CA)

( * ) Notice: Subject to any disclaimer, the term of this patent is extended or adjusted under 35 U.S.C. 154(b) by 440 days.

(21) Appl. No.: 17/525,467

(22) Filed: Nov. 12, 2021

(65) Prior Publication Data

US 2023/0152788 A1 May 18, 2023

(51) Int. Cl.
| | | |
|---|---|---|
| G06F 3/0482 | (2013.01) | |
| G05B 19/418 | (2006.01) | |
| G05B 23/02 | (2006.01) | |

(52) U.S. Cl.
CPC ... *G05B 19/41885* (2013.01); *G05B 23/0283* (2013.01); *G06F 3/0482* (2013.01)

(58) Field of Classification Search
CPC ...... G05B 19/418; G05B 23/02; G06F 3/0482
See application file for complete search history.

(56) References Cited

U.S. PATENT DOCUMENTS

| | | | | |
|---|---|---|---|---|
| 11,150,635 B2 * | 10/2021 | Middendorf | ....... | G05B 19/4183 |
| 2011/0022198 A1 * | 1/2011 | Plache | ............. | G05B 19/41845 |
| | | | | 700/86 |
| 2011/0131017 A1 * | 6/2011 | Cheng | .............. | G05B 19/41885 |
| | | | | 703/2 |
| 2016/0010445 A1 * | 1/2016 | Harrison | .............. | G05B 19/406 |
| | | | | 702/6 |
| 2016/0188769 A1 * | 6/2016 | Aylott | .................... | G06Q 50/06 |
| | | | | 703/6 |
| 2017/0322860 A1 * | 11/2017 | Malani | ................ | G06F 11/3457 |
| 2019/0101898 A1 * | 4/2019 | Middendorf | ...... | G06Q 10/06313 |
| 2020/0372077 A1 * | 11/2020 | Religa | ...................... | G06F 40/18 |
| 2020/0387143 A1 * | 12/2020 | Nixon | .............. | G05B 19/41835 |
| 2021/0012770 A1 * | 1/2021 | Choudhary | ............. | G10L 15/22 |
| 2022/0187818 A1 * | 6/2022 | Kondejkar | ........... | G05B 23/027 |
| 2023/0013700 A1 * | 1/2023 | Strohmenger | ......... | G05B 17/02 |
| 2023/0274661 A1 * | 8/2023 | Asenjo | ................... | G06Q 10/06 |
| | | | | 705/7.42 |

OTHER PUBLICATIONS

Foreign Search Report on PCT Dtd Jan. 10, 2023.

* cited by examiner

*Primary Examiner* — Anil K Bhargava
(74) *Attorney, Agent, or Firm* — Foley & Lardner LLP

(57) ABSTRACT

A digital twin model based plant operation and optimization is provided. Systems and methods of the solution can receive data on assets of a plant, the assets' topology, connectivity and flow and deployed physical instruments along with the measurements of the physical instruments. The solution generate a model having a plurality of layers based on the received data and provide one or more virtual instruments in the model. The solution can determine, based on a set of relationships for interactions between assets and the received measurements input into the model, one or more virtual measurement for the one or more virtual instruments and generate, responsive to a comparison with a threshold, a notification to service at least one of the assets at the plant.

18 Claims, 17 Drawing Sheets

← → C  🔍 https://www.mypani.com/onboarding                Pani Digital

< Client Mode

Step 1 of 10
Plant Details

🔵 First things first. I need to know a little bit about the plant before we get started.

Industry

Select the industry to which this plant belongs. This will help me decide which KPIs to use and models to apply.

◉ Desalination
○ Industrial Wastewater
○ Municipal Wastewater

Product Tier

Select the product tier for which this plant has subscribed.

○ Base
○ Brite
◉ Genius

🔑 Tip: You can come back and update product tier later when the plant is ready to upgrade.

[ Next ]

Model 500

1. Configure

Using the plant's piping and instrumentation diagrams (P&ID), process flow diagrams (PFDs), plant operating procedures and equipment data sheets, build the DT1 (digital twin level 1) representation using the graphical user interface shown in the image below.

*Data requirements by DT layer:*

| Assets | Topology | Flow & Connectedness | Instrumentation |
|---|---|---|---|
| 1. Equipment data sheets | 1. P&ID<br>2. PFD | 1. P&ID<br>2. PFDs | 1. P&ID) |

← ACT 502

2. Load Historic Data

Upload historic data keyed by tag identifiers. For instance, in *Step 1. Configure*, a user may have specified a tag, FT-101. Uploading a spreadsheet which contains data for this tag will then map this historic data to said sensor in the system.

← ACT 504

3. Established Live Data Connectivity

Install or configure an IoT device on premise and establish a direct data connection to the cloud via a supported data exchange protocol (MQTT, REST).

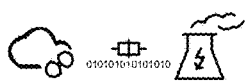

← ACT 506

4. Execute "Fact" Auto-derivation

The smart digital twin engine processes the plant information and derives new information as a function of the plant configuration.

← ACT 508

 *The digital twin continues to process streaming data and keeps all derived process intelligence from interfaced modules up to date.*

← ACT 510

FIG. 5

| KPI | Applicable Assets | Input Properties | Output Property | Process Type |
|---|---|---|---|---|
| Pressure Drop (Reverse Osmosis) | [RO Train, RO System, RO Stage, RO Pressure Vessel] | Feed Pressure, Concentrate Pressure | Pressure Drop | Reverse Osmosis |
| Recovery | [Plant, RO System, RO Train, RO Stage, RO Pressure Vessel, Plant] | Feed Flowrate, Permeate Flowrate | Recovery | Reverse Osmosis |
| Feed Flowrate | [RO System, RO Train, RO Stage, RO Pressure Vessel, Plant] | | Feed Flowrate | Reverse Osmosis |
| Permeate Flowrate Normalized Permeate Flowrate | [RO System, RO Train, RO Stage, RO Pressure Vessel, Plant] | Permeate Flowrate, Concentrate Flowrate | Permeate Flowrate Normalized Permeate Flow | Reverse Osmosis |
| Normalized Pressure Drop | [RO Membrane Array] | Feed Flowrate, Concentrate Flowrate, Permeate Flowrate, Flow Normalization Factor, Reference Flow Normalization Factor, Pressure Drop, Pressure Drop Normalization Factor, Reference Pressure Drop Normalization Factor] | Normalized Pressure Drop | Reverse Osmosis |
| Normalized Salt Passage | [RO Membrane Array] | Salt Passage, Salt Passage Normalization Factor, Reference Salt Passage Normalization Factor | Normalized Salt Passage | Reverse Osmosis |
| Concentrate Flowrate | [RO System, RO Train, RO Stage, RO Pressure Vessel, Plant] | Feed Flowrate, Permeate Flowrate | Concentrate Flowrate | Reverse Osmosis |
| Salt Passage | [Plant, RO System, RO Train, RO Stage, RO Pressure Vessel] | Permeate TDS, Feed TDS | Salt Passage | Reverse Osmosis |
| Feed TDS | [Any] | [Feed Conductivity] | Feed TDS | General |
| Permeate TDS | [Any] | [Permeate Conductivity] | Permeate TDS | General |
| Concentrate TDS | [Any] | [Concentrate Conductivity] | Concentrate TDS | General |
| Feed TDS (SMRO) | [Any] | [Feed Conductivity, Feed Temperature] | Feed TDS | General |
| Permeate TDS (SMRO) | [Any] | [Permeate Conductivity, Permeate Temperature] | Permeate TDS | General |
| Concentrate TDS (SMRO) | [Any] | [Concentrate TDS, Concentrate Temperature] | Concentrate TDS | General |
| Feed TDS (Mass Balance) Concentrate TDS (Mass Balance) | [Plant, RO System, RO Train, RO Stage, RO Pressure Vessel, Membrane Element] | Feed Flowrate, Concentrate TDS, Permeate TDS, Flowrate, Concentrate Flowrate, Permeate TDS | Feed TDS | Reverse Osmosis |
| Permeate TDS (Mass Balance) | [Plant, RO System, RO Train, RO Stage, RO Pressure Vessel, Membrane Element] | Feed Flowrate, Concentrate Flowrate, Permeate TDS, Feed TDS | Concentrate TDS | Reverse Osmosis |
| | [Plant, RO System, RO Train, RO Stage, RO Pressure Vessel, Membrane Element] | Feed Flowrate, Concentrate Flowrate, Permeate Flowrate, Feed TDS, Concentrate TDS | Permeate TDS | Reverse Osmosis |
| Sludge Retention Time (SRT) | [Aeration Tank] | [WAS_concentration, WAS_flow, Volume_aerobic, MLSS] | SRT | Aeration Tank |
| Mixed Liquor Suspended Solids (MLSS) | [Aeration Tank] | [RAS_flow] | MLSS | Aeration Tank |
| Returned Activated Sludge (RAS) | [Sludge Flow, Secondary Clarifier] | MLSS | | Secondary Clarifier |
| Wasted Activated Sludge (WAS) | [Secondary Clarifier, Sludge Flow] | [WAS_flow] | WAS | Secondary Clarifier |

FIG. 8

DIGITAL MODEL BASED PLANT OPERATION AND OPTIMIZATION

BACKGROUND

A facility running an industrial process can utilize different assets for its processing or production, including for example, different machines, devices, objects or tools, each of which can perform or facilitate one or more portions of the production or process. These assets may vary in many ways, including their type, size, performance and the amount of resources they use for their operation. The amount of resources used by these assets can vary based on their efficiencies, which in turn can depend on their condition, settings, wear and tear, and whether or not their time for servicing or replacement is coming up. As the efficiencies and performance of the individual assets can change over time, the efficiency of the overall production process can be affected as well. This makes accurate monitoring of processing and production at facilities more difficult to gauge, which in turn adds to the challenges of any modeling solutions that are already either prohibitively inaccurate, costly, or both.

SUMMARY

Systems and methods of this technical solution are generally directed to digital twin modeling of a process or a system deployed in a plant such as an industrial facility. The modeling provided by the present solution can allow users to visualize one or more assets of the process or a system in the context of both its physical and virtualized environment. For example, the present solution can allow the users, such as plant process operators, to monitor various assets of the plant, such as for example plant's equipment, systems, devices or tools, as they perform the plant's process or operation. The solution can also provide modeling of the plant's overall system or process and ability to perform accurate analysis or simulation of the assets' performance. Doing so can enable the users to track various parts of the process and model or simulate any impact of potential changes to the process using virtual data before applying any changes to the actual process at the plant are made. The solution thereby allows the users to determine suboptimal operation of the plant and help optimize the process performance. The result is an intelligent and connected digital infrastructure model that supports operations, planning, and optimization of the process at a plant.

At least one aspect is directed to a system of modeling a plant. The system can include a data processing system that can comprise at least one processor coupled with memory. The data processing system can receive one or more measurements from one or more physical instruments located at a plant. The plant can comprise a plurality of assets that perform one or more functions at the plant. The data processing system can identify a virtual instrument for a location at the plant that lacks a physical instrument at that location. For example, the data processing system can include, or be coupled to, a virtual data generator that identifies the virtual instrument for the location. The data processing system can include or be coupled with a model that is constructed with a plurality of layers. The plurality of layers can correspond to: i) the plurality of assets at the plant; ii) a topology of the plurality of assets; iii) connections and flow direction of the plurality of assets; and iv) the one or more physical instruments at the plant. The data processing system can include or be coupled to a model generator that generates or constructs the model with the plurality of layers. The data processing system can determine, based on a set of relationships for interactions between the plurality of assets, and based on the one or more measurements input into the model, a virtual measurement for the virtual instrument. The data processing system can generate, responsive to a comparison of the virtual measurement with a threshold, a notification to service at least one of the plurality of assets.

At least one aspect is directed to a method of modeling a plant. The method can be performed by a data processing system having memory and one or more processors. The method can include the data processing system receiving one or measurements from one or more physical instruments located at a plant. The plant can comprise a plurality of assets that perform one or more functions at the plant. The method can include the data processing system identifying a virtual instrument for a location at the plant that lacks a physical instrument at the location. The method can include the data processing system determining a virtual measurement for the virtual instrument based on a set of relationships on interactions between the plurality of assets and the one or more measurements input into a model. The model can be constructed with a plurality of layers corresponding to: i) the plurality of assets at the plant; ii) a topology of the plurality of assets; iii) connections and flow path of the plurality of assets; and iv) the one or more physical instruments at the plant, a virtual measurement for the virtual instrument. The method can include the data processing system generating, responsive to a comparison of the virtual measurement with a threshold, a notification to service at least one of the plurality of assets.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 4A-4E are illustrations of examples of a user interface for specifying a model.

FIG. 5 is an illustration of an example a method for configuring and executing a model.

FIG. 8 is an illustration of a table with various parameters that can be used by the data processing system 100 for identifying and triggering rules.

DETAILED DESCRIPTION

Figure 1:
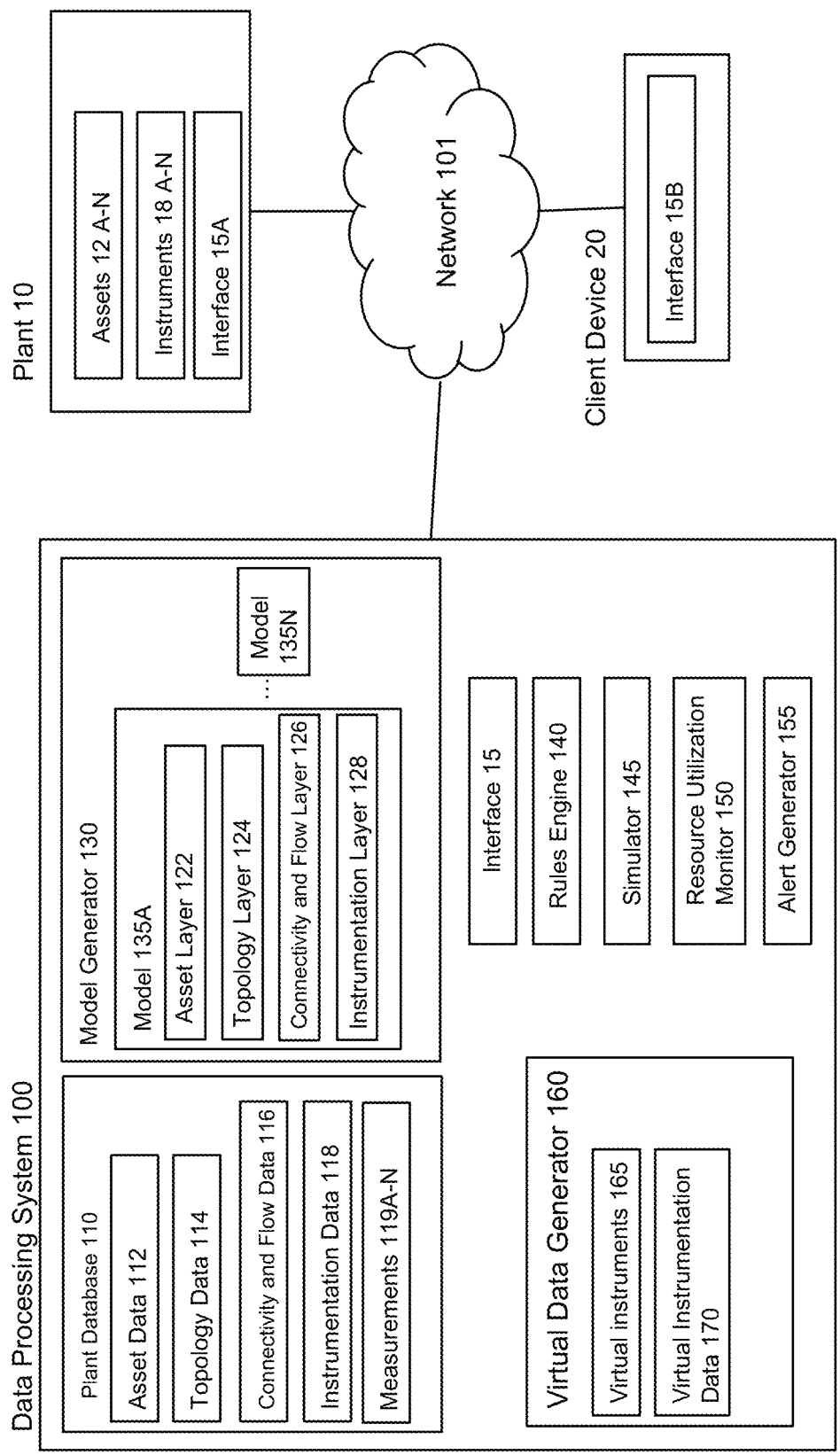
FIG. 1 is an illustration of an example data processing system 100 operating over a network.

Following below are more detailed descriptions of various concepts related to, and implementations of, methods, apparatuses, and systems of modeling a plant. The various concepts introduced above and discussed in greater detail below may be implemented in any of numerous ways.

Digital twin modeling technology described herein can include a virtual representation of an object or system. One of the challenges with digital twins technology today is its general lack of widespread applicability. Simpler modeling solutions are often marketed as faster and more affordable, they are too inaccurate to provide meaningful and reliable results to meet the real-life plant goals. On the flip side, customized models, while touting improvements in accuracy, can be costly, time consuming and difficult to create and operate, while also requiring specific domain knowledge and being generally limited only to implementations that are incapable of adjusting to changes over time. These challenges can be compounded in the use cases in which systems and processes modeled are complex and rely on many different types of assets, each of which may have its own unique rate of performance, service that can be performed on them and other changes associated with them over time. In such instances, changes to the modeled system or process can occur over time and accounting for them can be important to their accurate modeling and optimal operation.

The present solution addresses these and other challenges by providing a solution that includes systems and methods for generating and using a digital model of a plant or other facility that is both customizable for a specific plant, thus enabling a high level of accuracy, while at the same time being also more affordable as it is quick to implement and easy to use. By providing a multi-layer model constructed or generated with layers corresponding to: i) the plurality of assets at the plant; ii) a topology of the plurality of assets; iii) connections and flow path of the plurality of assets; and iv) the one or more physical instruments at the plant, a virtual measurement for the virtual instrument, the present solution provides rapid and effective plant modeling. Likewise, by determining one or more virtual measurements for one or more virtual instruments based on a set of relationships on interactions between the plurality of assets and the one or more measurements input into the model, the present solution also improves accuracy over other models. In addition, by generating, responsive to a comparison of the virtual measurement with a threshold, a notification to service at least one of the plurality of assets, the present solution enables effective optimization or operation of the systems and process at the plant. This optimization can reduce power usage of the plant, or extend the operational life of the plant and components thereof.

Systems and methods of the present solution can include a cloud-based tool that simplifies creation of a digital twin system applicable to any number of industrial processes. The solution can be scalable so as to use minimal technical expertise or to develop or update. The technology described herein can include a hybrid of physical and virtual data, and can rely on physical data from plant sensor or instrumentation measurements, as well as data generated by virtual instruments.

The data processing system of the solution described herein can generate new information from one or more user inputs, which can improve the accuracy, efficiency or scalability of the model. This solution can enable the user to develop digital twin solutions for a wide variety of facilities to model their assets, the interactions between the assets and the overall process throughput. The solution can implement these functionalities, not only using data from physical measurement instruments, such as detectors or sensors, but also by using virtual data, which can be generated from the physical data and provide a heightened level of accuracy of estimate of the process flow, asset conditions and the timing for servicing of the assets.

FIG. 1 depicts an example system to model a plant 10. The system can include at least one data processing system 100 in communication with at least one plant 10 and at least one client device 20 over at least one communication network 101. Data processing system 100 can include at least one plant database 110 that can include asset data 112, topology data 114, connectivity and flow data 116, instrumentation data 118 and measurements 119. Data processing system 100 can include at least one model generator 130 that can include one or more models 135A-135N, including for example a model 135A that can comprise an at least one asset layer 122, topology layer 124, connectivity and flow layer 126, and instrumentation layer 128. Data processing system 100 can include at least one interface 15, at least one rules engine 140, at least one simulator 145, at least one resource utilization monitor 150 and at least one alert generator 155. The data processor system 100 can include a virtual data generator 160 that includes one or more virtual instruments 165 and one or more virtual instrumentation data 170.

The plant 10 can include at least one asset 12A-N, such as machines, devices or tools, for operating or facilitating a process. The plant 10 can include at least one measurement instrument 18A-N that can take measurements or data on or corresponding to at least one asset 12A-N or to the process at the plant 10. The plant 10 can include at least one interface 15 to communicate with the data processing system 100 or client device 20 via the communication network 101. The data processing system 100 can include at least one plant database 110. The plant database 110 can store data from any number of plants or facilities, including for example, the illustrated plant 10. The plant database 110 can include asset data 112, topology data 114, connectivity and flow data 116 and instrumentation data 118. The data in the plant database 110 can for example include information or data on plant 10 and its asset(s) 12, their topology, their connectivity and flow, as well as the data from measurement instruments 18 at the facility 10.

A plant 10 can include any plant (e.g., a facility) that performs a process or that includes a system to be modeled. The plant 10 can include any plant, factory or a fabrication facility. Plant 10 can include a manufacturing facility, a service or production facility, a retail facility. Plant 10 can include one or more plants or one or more facilities working together implementing one or more processes, activities or productions. A plant 10 can include any one or more facilities running any one or more processes, such as processes for servicing, manufacturing, production, sales or any other commercial activity. Plant 10 can include, for example, a water treatment plant, a water desalination plant, a pulp and paper plant, a chemical synthesis pharmaceutical plant, a nuclear power plant, a semiconductor device fabrication facility, a consumer electronics factory, a retail facility, an automobile factory, an aircraft factory, such as an airplane or a drone factory, a solar power plant, a wind energy plant, an oil drilling plant, a food processing plant. Plant 10 can include a distillation plant or an ion exchange plant. Plant 10 can include fluid treatment plant that uses a membrane-based process, including for instance an electrodialysis reversal plant, reverse osmosis plant, a nanofiltration plant, a membrane distillation plant, or a forward osmosis plant. Plant 10 can include a freezing desalination plant, geothermal desalination plant, solar desalination plant, or a methane hydrate crystallization plant. Plant 10 can be modeled by a digital twin system generated and run by the data processing system 100 using the data from assets 12A-N and instruments 18A-N.

Assets 12A-N can be any assets used for or in a process or production, including equipment, machines, devices, systems and tools that perform any function related to a process or a system at the plant 10. An asset 12 can include, for example, any type or form of a system or any of its component, such for example a thermal system, a chemical system, a biochemical system, a mechanical system, an electrical or an electronic system, an electromechanical system, a biological system, a photoelectric system, a photovoltaic system, a membrane system, a filtration system, a fluid processing system, a solid material processing system, a gas processing system, or any other type and form of a system used in a plant 10.

Assets 12A-N can include any electromechanical machines or devices, such as a pump, including an air pump, a water pump, an oil pump, a mud pump, a drilling pump, a low or a high pressure pump, a turbo pump, or a cryogenic pump. An asset 12 can include a motor, an engine, or any other type of a system converting energy into motion or vice versa. An asset 12 can include a wind or a water turbine, a stirring system or a propeller or a fan system. An asset 12 can include a press, such as a mechanical press or a hydraulic press, or systems such as a grinder or a pulverizer, a conveyor belt or a pulley system. The asset 12 can include a mechanical clarifier, such as for example, a wastewater clarifier.

Assets 12A-N can include any type and form of a heating or cooling device. An asset 12 can include an oven or a heater, a furnace, such as a natural gas furnace, a single-stage or multi-stage furnace system, a forced air or gas furnace, or a dryer. The asset 12 can include a combustion system or any of its potential components, such as for example a combustor, a burner, or an igniter. An asset 12 can include a cooler, a fridge or a freezer, or a heat exchanger.

Assets 12A-N can include any type and form of filtration systems or devices, such as a water filter, an air filter, an oil filter, or a cartridge filter. Asset 12 can include a distillation system or any of its subsystems and components, as well as a reverse osmosis system or any of its subsystems and components, such as a reverse osmosis production train, that can include one or more reverse osmosis membranes. Asset 12 can include an ozonation system and any one or more of its components and subsystems. Assets 12A-N can include any type and form of storage or pressure systems, such as a tank or a storage device for materials or fluids, such as a water tank, an oil tank, an air tank, a solvent reservoir, a high or low pressure chamber or a pressure tank, or an aeration basin.

An instrument 18A-N can include any type and form of a device for sensing, measuring or a data collection. An instrument 18 can include a fluid flow sensor, such as a flow gauge or a flow rate sensor or detector, a mass flow meter or a differential pressure meter. An instrument 18 can include a sensor or a detector measuring force, velocity, acceleration, temperature, pressure, chemical composition, salinity of a fluid, concentration of salts or oils, or concentration of certain particles or molecules in a fluid, such as the concentration of oxygen-based or carbon-based molecules. Instrument 18 can, for example, measure density of a fluid or a solid material, oxidation level, concentration of smoke or ashes. An instrument 18 can include a position, a vibration or a photo optic sensor or a detector. An instrument 18 can include a vibration sensor, a piezo sensor, a strain gauge, a humidity sensor. An instrument 18 can include a vision or an imaging or a light sensor or detector, a particle sensor, a motion sensor, a leak sensor or a chemical sensor. An instrument 18 can include sensors for detecting chemical molecules.

An instrument 18 can include systems and functionalities that interface with a sensor and processes and stores its measurements. For example, an instrument 18 includes circuitry for scaling and amplifying the sensor signal. The instrument 18 can include the functionality for digitizing the sensor signal. The instrument 18 can include the functionality for collecting and storing sensor readings or values.

An interface 15 at the data processing system 100, as well as an interface 15A at the plant 10, or interface 15B at the client device 20, can include any computer or a digital system interface for digital communication or interaction between the data processing system 100, plant 10 or the client device 20. An interface 15 can include hardware and software to provide a computer interface functionality for a user to interact to or from the data processing system 100. An interface 15 can include an application interface or a program interface to provide a means of interaction. Interface 15 can include a web browser interface, a graphical user interface, a menu interface, a form based interface or a natural language interface.

A data processing system 100 can include any combination of hardware and software for modeling a plant or a plant 10. A data processing system 100 can include a system for creating and running a digital twin. A data processing system 100 can include functionality for generating a model of a system or a process at a plant 10. The data processing system 100 can model the system or the process by constructing a model 135 that includes multiple layers 122-128. The layers 122-128 can include or be based on physical data about the assets 12, their topology, connectivity and flow or movement of materials among them, as well as their sensor instrumentation 18 and such sensor measurements 119. Rules engine 140 can utilize any number of rules to assist in creating the model 135 by providing and establishing sets of relationships between different parts of the modeled system. Data processing system 100 can use the generated model 135 to generate virtual data with the help of virtual data generator 160. The generated virtual data can include virtual instruments 165 and their corresponding virtual instrumentation data 170. Data processing system 100 can use the simulator 145 to simulate the process using the real and virtual data or to optimize the process. The data processing system 100 can, for example, optimize the process by predicting future performance of the process or the assets, determine when each of the assets should be serviced or replaced, or determine the optimal settings for the assets. The monitoring of the assets can be done using resource utilization monitor 150. Alert generator 155 can generate one or more alerts when any one of the assets 12 modeled in the model 135 drop their performance, quality, or status below a threshold.

Figure 7:
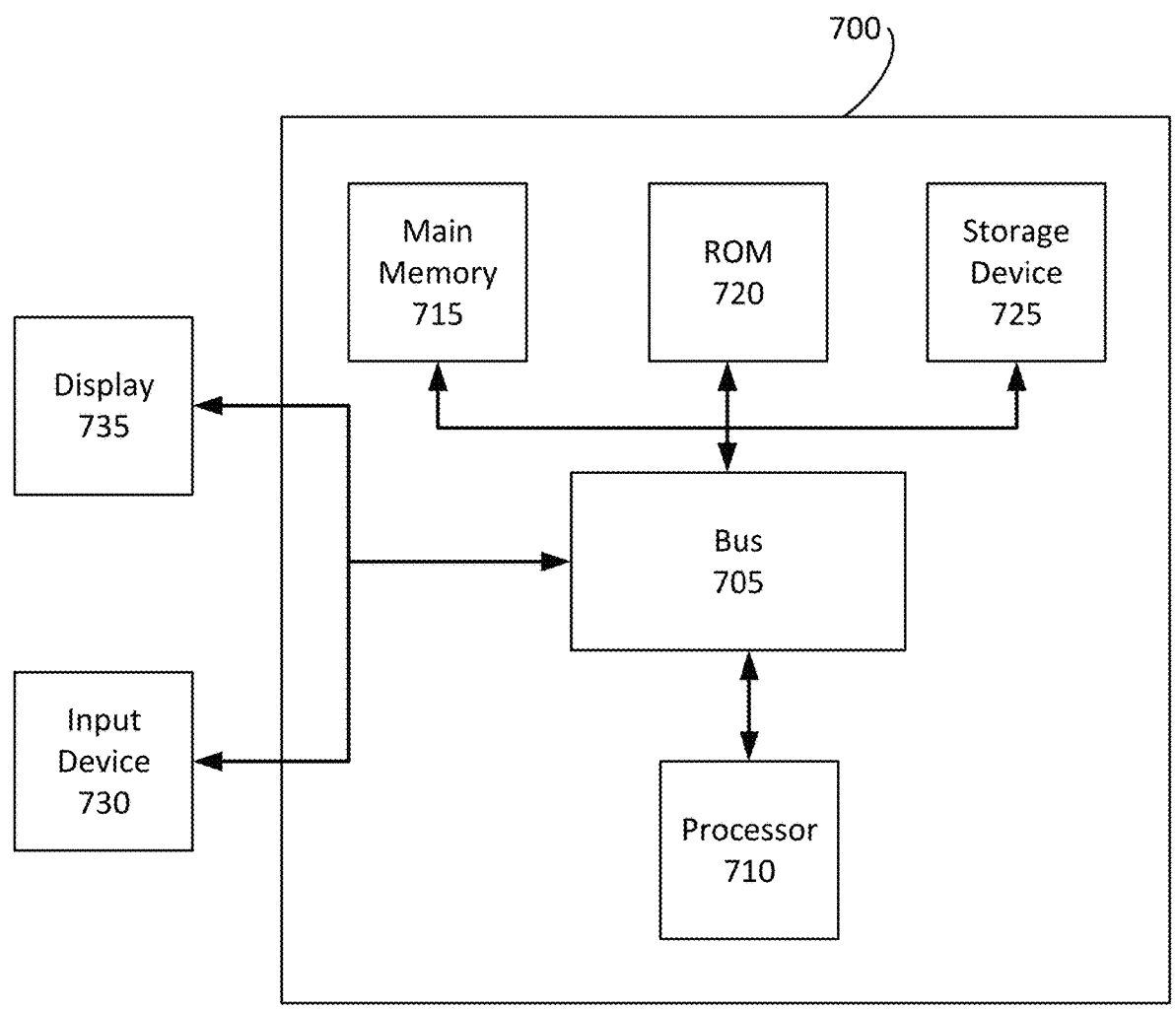
FIG. 7 is a block diagram illustrating an architecture for a computer system that can be employed to implement elements of the systems and methods described and illustrated herein, including, for example, the system depicted in FIG. 1 and the operational flows or methods depicted in FIGS. 5 and 6A-6B.

The data processing system 100 can operate on any type and form of a computing device, such as a cloud system, a server-device or client device that comprises or uses features or systems, such as those described for example FIG. 7. The data processing system 100 can therefore communicate over a network 101 with a plant 10 and a client device 20. Data processing system 100 can include at least at least one logic device such as a computing device having one or more processors to communicate via the network 101.

The data processing system 100 can include at least one computation resource, server, processor or memory. For example, the data processing system 100 can include a plurality of computation resources or servers located in at least one data center. The data processing system 100 can include multiple, logically-grouped servers and facilitate distributed computing techniques. The logical group of servers may be referred to as a data center, cloud computing environment, cloud server, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

A plant database 110 can include one or more local or distributed databased for storing data corresponding to one or more facilities 10, their processes and the assets performing such processes. A data processing system 100 can include one or a plurality of plant databases 110. A plant database 110 can include a database management system for facilitating storing, accessing and using of the stored data. Plant database 110 can be designed to have the same data structures for all facilities or to be optimized for particular facilities 10 and to include features unique to individual facilities.

A plant database 110 can include any information on assets running a process at a plant 10. For example, a plant database 110 can include any information on the assets themselves, or their internal state, status, configurations and settings. A plant database 110 can include any information on the geometric or spatial relationships or arrangements of the assets 12 at the plant 10. The plant database 110 can include information on connections between the assets 12, as well as any direction of flow between the assets 12. Plant database 110 can include any data from instruments 18 at the plant, as well as the location of those instruments 18 and their relation to the assets 12 and the process run by the assets 12 itself.

Asset data 112 can include any information on assets 12A-N. For example, asset data 112 can include information on each individual asset 12 as well as collective information on assets 12A-N as a whole. Asset data 112 can include any technical information specific to an individual asset 12, such as for example, its name, make and model, its serial number, its latest updated firmware or software versions, its individual settings and configurations, its individual operation state or operation data. Asset data 112 can include asset 12 specifications, including all of the data from its data or specification sheet. Asset data 112 can include asset 12's estimate of useful life remaining, its current operating efficiency, the time since its last service or update, its current battery life or current power level. Asset data 112 can include information on an asset's power usage or consumption, its electrical current draw, or its resistance or impedance. Asset data 112 can include the asset's internal sensor readings, such as, for example, the asset's temperature, pressure, vibration, force, flow rate, fluid velocity, turbidity, or any other readings that is known in the industry to be taken or considered for an asset 12, either internally or externally.

Asset data 112 can include any information on a collection of assets 12A-N, including any asset 12A-N group settings or configurations. For example, asset data 112 can include information or data on asset 12A-N collective updates, reconfigurations, or modifications. Asset data 112 can include information on management of two or more assets 12 in a plant 10 as a group. Asset data 112 can include information on synchronization or coordination between any assets 12A-N. Asset data 112 can include any data or information that is known in the field to be used for monitoring or determining performance of an asset 12.

Asset data 112 can include information on models of particular pieces of equipment, including for example models that mimic inputs, outputs and entire performance of the individual piece of equipment. For example, asset data 112 can include a model of a pump, including the pump's specific inflow and outflow of fluid pumped, power consumptions, settings, configurations, capacity and any other features used for accurately modeling such a pump in operation. Asset data 112 can include similar models for any other type and form of equipment, device or tool described herein, including among others a filter, a clarifier, an aerial basin, a product tank, an ozonation system, a sterilizer, a heater, heat exchanger, a valve or any other similar systems and components.

Topology data 114 can comprise any information or data corresponding to arrangement of assets 12A-N. Topology data 114 can include information on geometric properties or spatial relations between assets 12A-N. Topology data 114 can include information that identifies which asset 12 interfaces with which other assets or in what order or arrangement. Topology data 114 can include any information or data describing placement, arrangement, organization, interaction or spacing between assets 12A-N.

Topology data 114 can include information on the order of individual assets in a process or production. For example, topology data 114 can include information that asset 12B stands between an asset 12A and asset 12C. Topology data 114 can include information that assets 12A and 12B are arranged one next to the other. For example, topology data 114 can include information on which asset 12 interfaces with which other asset 12 at the plant 10 and how they are spaced with respect to each other. Topology data 114 can include information that arranges all assets 12A-N from the first to the last in their order in which they appear in the process run at the plant 10.

Connectivity and flow data 116 includes any information or data on connections and flow between assets 12A-N. For example, connectivity and flow data 116 includes information on which asset 12 is connected to which other asset 12 and how, as well as the information on the direction of flow of materials between the connected assets. Connectivity and flow data 116 can include data and information on how one or more outputs of an asset 12 are connected to one or more inputs of another asset 12 or in which direction is the flow between these two assets. For example, connectivity and flow data 116 can include information or data on how one or more outputs of an asset 12A are connected to inputs of two or more assets 12 of the plurality of assets 12A-N as well as information on the direction of the flow between the two assets. Connectivity and flow data 116 can include information and data on direction of flow of the process materials between the outputs of two or more assets 12 are connected to an input of an asset 12.

Connectivity and flow data 116 can include any information on valves used in the connectivity of the assets. Data 116 can include a valve's make and model, its performance, throughput, capacity and any other information for accurately determining the flow in the modeled process or system. For example, connectivity and flow data 116 can include a model of a valve to accurately model the flow through the valve at any of the valve's settings.

Connectivity and flow data 116 can include any information on the specification of the connection between assets 12. For example, connectivity and flow data 116 can include information or specifications on the diameter of a pipe between assets 12, or the length of a pipe, a corner of a pipe and the angle and radius of the corner. Connectivity and flow data 116 can include information or specification on the size or speed of a conveyor belt between two assets 12, size of a channel through which fluid flows. Connectivity and flow data 116 can include number or devices or vehicles moving materials between assets 12, such as for example a number and sizes of carts or vehicles for moving materials. Connectivity and flow data 116 can include information on any one or more devices handling movement from an asset 12A to an asset 12B. Connectivity and flow data 116 can include information on any paths, channels, or devices for moving materials handled or processed by assets 12 between the assets themselves.

Connectivity and flow data 116 can include any information or data on movement or flow of materials handled or processed by assets 12A-N. The materials handled or processed can include any material, substance, product or object handled or processed by assets 12A-N, including, for example: fluid (whether liquid or gas), sludge, wastewater, drinking water, still water or carbonated water, natural gas, pressure gasses, mud, oil, petroleum, natural rocks or ore, sediment, sand, cement, mortar, bricks, building materials, articles of food, articles of clothing, mechanical or electrical devices, consumer electronics and their parts, automobiles and their parts, solar panels, wind turbines, pharmaceutical products, medical products, or any other type and sort of materials that can be the part of the flow processed or moved by assets 12 at a plant 10.

Instrumentation data 118 can include any information on one or more instruments 18A-N and any data from instruments 18A-N. Instrumentation data 118 can include data on the location of the instruments 18A-N in the process modeled at the plant 10. For example, instrumentation data 118 can include data on location of each instrument 18, such as a sensor, with respect to the assets 12. Instrumentation data 118 can include information on the type of instrument 18, its make and model, its calibration, internal settings and configuration, and operation. Instrumentation data 118 can include data on time of calibration of the instrument 18 from which data is collected or the accuracy range of the measurements.

Measurements 119 can include data and readings from the instruments 18. Measurements 119A-N can correspond to a plurality of instruments 18A-N from which they have originated. For example, measurements 119A can correspond to an instrument 18A, while measurements 119B can correspond to an instrument 18B, and so on. Therefore, measurements 119 from each individual instrument 18 can be stored in an individual data structure of the plant database 110.

Measurements 119 can include measurements or data of any sensors or detectors discussed herein in connection with measurement instruments 18A-N. For example, measurements 119 can include measurement data on fluid flow, pressure, temperature, fluid density, salinity, concentration of particular particles or molecules, electric charge, voltage potential, electric current, optical signal, or any other measurements that instruments 18A-N discussed herein could measure. Measurements 119 can include measured data organized and stored in any digital format, including data structures for each type of instrument 18.

Measurements 119 can include individual measurements from instruments 18A-N or a stream of data from instruments 18A-N taken over time. For example, measurements 119 can include a single measurement or a series of measurements from an instrument 18. When series of measurements are taken, such measurements can, for example, be taken periodically over time. Measurements 119 can thus include a stream of data measurements taken at particular periodic time intervals. Measurements 119 can include multiple measurements from an instrument 18 taken based on particular process events, such as events occurring during the process at plant 10, such as daily start or end of a production, plant maintenance, asset service times, asset testing, asset maintenance, or similar.

Measurements 119 can include real-time data streamed from the plant 10. For example, measurements 119 can include streamed real-time measurements of flow rate at an input into a particular asset 12. Measurements 119 can include streamed real-time measurements of a flow rate at an output of a particular asset 12. As measurements 119 can include Plant database 110 can include multiple data structures for storing and keeping track of measurements 119 from different instruments 18A-N 10 as well as for storing asset data 112, topology data 114, connectivity and flow data 116 and instrumentation data 118. For example, plant database 110 can include one data structure for storing all measurements 119 from a first instrument 18A, and a second data structure for storing all measurements 119 from a second instrument 18B. Plant database 110 can store metadata on the measurements 119, including for example data on timing when each reading was taken, data on periodicity of data measurements, time stamps for each data measurement, and type of data measurement, such as for example what is it that the measurement 119 is particularly measuring. Plant database 110 can include a data structure for each types of data 112-118.

A model 135 can include any model of a part of a plant 10, the entire plant 10 or of plurality of plants 10. A model 135 can include a model of a system or a process run or operated at or by the plant 10, such as a manufacturing system or process, a filtration system or process, a water treatment system or process, an oil drilling system or process, or any other system or process discussed herein. A model 135 can include a digital twin of a plant 10, including for example a digital twin of a part of a plant 10 that runs a particular process. A model 135 can include a digital twin of a plurality of processes run or operated at or by the plant 10, such as for example processes related to a function, product or a service. A model 135 can include a digital twin of one or more processes operated across multiple facilities 10, such as for example filtration processes where one plant 10 runs one part of a process and another plant 10 runs another part of the process.

A model 135 can include multiple layers for describing a process or operation of one or more facilities 10. For example, a model can include an asset layer 122, a topology layer 124, a connectivity and flow layer 126 or instrumentation layer 128. For example a model 135 can include fewer than four of these layers. For example, a model 135 can include any one or two or three of the stated four layers. A model 135 can include the stated four layers and one or more additional layers, such as a virtual layer comprising virtual instrumentation 165 and its corresponding virtual data 170.

Asset layer 122 can include any digital description, depiction, representation or modeling of assets 12. Asset layer 122 can include descriptions, depictions, representations or modeling using any asset data 112. For example, asset layer 122 can include a representation of one or more assets 12 in a model 135, such as a depiction, a figure, a drawing, a model or sketch of assets 12, any one of which can be done using information from asset data 112. Asset layer 122 can include identification of any asset 12A-N from asset data 112 of a facility 10. Asset layer 122 can include any asset data 112 information on any assets 12A-N pertaining to a process being modeled by model 135. Asset layer 122 can include technical data on any one of shown assets 12A-N, such as technical information or data included in asset data 112.

Asset layer 122 can include one or more models of one or more assets 12 modeled in model 135. The model of an asset can include a model of an asset 12 itself, to describe the asset's inputs, outputs and its performance. For example, when an asset 12 of the asset layer 122 is a piece of equipment, asset layer 122 can include the model of that asset and its components. The model of the asset can describe or represent asset's individual performance characteristics, including asset's input and output connections, asset's power consumption, asset's configurations and settings, asset's processing functionality, asset's throughput, and so on. By providing models of assets 12, asset layer 122 can enable modeling of those components as a part of the model 135.

A topology layer 124 can include any digital description, depiction, representation or modeling of topology of assets 12. Topology layer 124 can include descriptions, depictions, representations or modeling using any topology data 114. Topology layer can include a depiction, a figure, a drawing, a model or sketch of arrangement or topology of assets 12 in a process run or operated at or by plant 10. The depiction, drawing or a sketch can be done using information from topology data 114. Topology layer 124 can include arrangements, geometric relations or relative positions involving assets 12A-N. Topology layer 124 can include any data from topology data 114 of a plant 10. Topology layer 124 can include any topology data 114 information on any arrangement, ordering or positioning of any assets 12A-N pertaining to a process being modeled by model 135. Topology layer 124 can include data on distances or spacing between assets 12A-N, such as length of distances between the assets 12A-N, coordination data on the locations of assets 12A-N, order of assets 12A-N and so on.

A connectivity and flow layer 126 can include any digital description, depiction, representation or modeling of connectivity and flow between assets 12. Connectivity and flow layer 126 can include descriptions, depictions, representations or modeling using any connectivity and flow data 116. Connectivity and flow layer 126 can include a depiction, a figure, a drawing, a model or sketch of connections between assets 12 in a process run or operated at or by plant 10. The depiction, drawing or a sketch can be done using information from connectivity and flow data 116. Connectivity and flow layer 126 can include specifications on the means for moving process material from one asset 12 to another asset 12, such as for example a diameter or a radius of a pipe, a length of the pipe, a width or speed of a conveyor belt, a size of a channel through which fluid flows, a type of a vehicle for moving materials between the assets 12 and its speed and capacity, and any information on connectivity between assets 12 and flow of process materials between assets 12.

Connectivity and flow layer 126 can include models of the connections between the assets 12. For example, when asset layer 122 includes models of the individual assets 12, the connectivity and flow layer 126 can include models of connections between the assets. For example, when assets 12 are pieces of equipment of a reverse osmosis plant, connectivity and flow layer 126 can include models of pipes interconnecting the assets 12. Connectivity and flow layer 126 can include models of flow controllers between the assets, including valves, "T" connectors and various other components for connecting the assets.

An instrumentation layer 128 can include any digital description, depiction, representation or modeling of one or more measurement instruments 18 and their data. Instrumentation layer 128 can include descriptions, depictions, representations or modeling using any instrumentation data 118. Instrumentation layer 128 can include a depiction, a figure, a drawing, a model or sketch of instruments 18A-N taking measurements at a particular location in a process. For example, instrumentation layer 128 can illustrate, depict, represent, sketch or model instruments 18A-N and their locations with respect to assets 12. Instrumentation layer 128 can include measurements 119 of the instruments 18 in the model 135. The illustration, depiction, drawing, modeling or a sketch can be done using information from instrumentation data 118. An instrumentation layer 128 can include depiction of locations of instruments 18A-N with respect to assets 12A-N as described by their topology data 114 or connectivity and flow data 116. Instrumentation layer 128 can include any measurements 119 taken by instruments 18A-N, where instruments 18A-N can be represented or identified in instrumentation data 118.

A model generator 130 can include any combination of hardware and software for constructing or generating a model 135. For example, the model generator 130 can include a user interface, such as an interface 15A or 15B to enable a user to enter, identify or describe one or more assets 12, instruments 18 and plant 10. The model generator 130 can use the plant database 110 and any of its information to generate a model 135.

The model generator 130 can include any combination of hardware and software functions and scripts for generating or constructing any layer of the model. The model generator 130 can include the software functionality, scripts, computer programs and functions to generate layers 122-128 using their corresponding data 112-118. For example, model generator 130 can generate the asset layer 122 using the asset data 112. Model generator 130 can generate the topology layer 124 using topology data 114. Model generator 130 can generate the connectivity and flow layer 126 using connectivity and flow data 116. Model generator 130 can generate the instrumentation layer 128 using instrumentation data 118. Model generator 130 can generate the instrumentation layer 128 using measurements 119.

The model generator 130 can include the functionality to combine the layers 122-128 into a single model 135 of a plant 10. For example, model generator 130 can include the functionality to combine the information from layers 122-128 into a single representation of the process. Model generator 130 can generate the model depicting layers 122-128 individually as well as a combination, showing how the process operates.

The model generator 130 can include the functionality to add to the model 135 virtual instruments 165, as generated by virtual data generator 160. The model generator can place the virtual instruments 165 at various locations, such as locations where instruments 18A-N are not present. Model generator 130 can add a new separate layer for the virtual instruments 165, or can combine the virtual instruments 165 to the instruments 18 depicted in the instrumentation layer 128. Model generator 130 can add virtual instrumentation data 170 to the virtual instruments 165. The model generator 130 can process the virtual instrumentation data 170 using the same techniques used to process the instrumentation data 118.

A model generator 130 can include scripts, functions and computer code for training a model 135 using training data. Training data can include asset data 112, topology data 114, connectivity and flow data 116 and instrumentation data 118. Training data can include virtual instrumentation data 170 from virtual instruments 165. For example, training data can utilize various instrumentation data 118 to train the model 135 rates of flow between different assets at the model. Training data can use a combination of instrumentation data 118 and virtual instrumentation data 170 to train the model 135.

The model generator 130 can train the model 135 using training data to identify or predict events, such as breakdown, time for service or end of life of one or more assets 12, performance of one or more assets 12 through time, performance of the assets and the process through time, and so on. Model generator 130 can utilize virtual instruments 165 and virtual instrumentation data 170 to predict future events and performance The model generator 130 can generate or train the model 135 using a machine learning technique. The model generator 130 can use any type of machine learning technique, including, for example, supervised learning, unsupervised learning, or reinforcement learning. The model generator 130 can use functions such as linear regression, logistic regression, a decision tree, support vector machine, Naïve Bayes, k-nearest neighbor, k-means, random forest, dimensionality reduction function, or gradient boosting functions.

Virtual instruments 165 can include any virtual objects performing functions of measuring, sensing or counting any feature or output of the model 135 using any combination of physical instruments 118 or their measurements 119. Virtual instruments 165 can include any virtual objects mimicking instrument 18A-N, any functionality of an instrument 18 or can include any digital representation of an instrument 18.

A virtual instrument 165 can be placed in a part of a model 135 that corresponds to a location in which an instrument 18 is missing. For example, when a model 135 of a plant 10 is generated by a model generator 130, instruments 18 can be placed in the respective locations as they exist in the plant 10, whereas virtual instruments 165 can be placed in locations in which physical instruments 18 are not present. In some implementations, in the model 135 virtual instruments 165 can be placed right next to, or within, physical instruments 18. Virtual instruments 165 can, for example, provide virtual readings at the locations that are not measured by instruments 18 at the plant 10. In doing so, virtual instruments 165 can fill in missing data and help improve the accuracy and granularity of the model 135.

Virtual instruments 165 can include, measure or keep track of one or more key performance indicators (KPIs). The key performance indicators can be measurements that are not normally measured using physical sensor or a detector, such as for example, efficiency of an asset, such as a filter or a pump, a quality of the output of the asset, a total output of the piece of the asset within a time period, a total asset output over asset's lifetime, an estimate of a total asset output left before the asset has to be serviced, provided maintenance or replaced, a current throughput of an asset, a throughput of an asset within a set time period, such as a daily, a monthly, or annual asset throughput, a concentration of particular molecules or components in the output fluid of an asset, a rate of permeate flow from an asset, a normalized pressure drop across one or more objects or features, an energy consumption of an asset, number of hours an asset has operated, the type of service or replacement completed last time.

Virtual instruments 165 can measure or gather data on any number of different parameters, including for example one or more of the following: approximate concentrate throttling valve coefficient, average normalized permeate flow change per month since last cleaning, average normalized pressure drop change per month since last cleaning, average normalized salt passage change per month since last cleaning, average running hours between cleanings, average time between cleanings, average water produced between cleanings, cleaning effectiveness normalized permeate flowrate, cleaning effectiveness normalized pressure drop, cleaning effectiveness normalized salt passage, concentrate density, concentrate flowrate, concentrate osmotic pressure, concentrate pressure, concentrate total dissolve solids ("TDS"), daily energy consumption, daily membranes replaced, daily production, daily running hours, daily water treated, efficiency, feed flowrate, feed osmotic pressure, feed TDS, flux, food to microorganism ratio ("f/m"), hydraulic retention time ("hrt"), inlet density, internal recycle ("ir"), ion concentrations, maximum membrane element feed flowrate, maximum membrane element flux, maximum membrane element permeate flowrate, maximum membrane element recovery, membrane cleaning or replacement signal, membrane replacement signal, membrane salt permeability, membrane water permeability, minimum membrane element concentrate flowrate, mixed liquor suspended solids ("miss"), net positive suction head available, net positive suction head required, new membrane permeate flow, new membrane pressure drop, new membrane salt passage, normalized permeate flow after cleaning, normalized permeate flow before cleaning, normalized permeate flow change since last cleaning, normalized permeate flow change since last replacement, normalized permeate flowrate, normalized pressure drop, normalized pressure drop after cleaning, normalized pressure drop before cleaning, normalized pressure drop change since last cleaning, normalized pressure drop change since last replacement, normalized salt passage, normalized salt passage after cleaning, normalized salt passage before cleaning, normalized salt passage change since last cleaning, normalized salt passage change since last replacement, number membranes replaced, organic volumetric loading rate, permeate flow normalization factor, permeate flow percent change due to membrane conditions, permeate flow percent change due to operating conditions, permeate flowrate, permeate osmotic pressure, permeate TDS, power consumption (1 phase alternate current ("AC")), power consumption (3 phase AC), power consumption (centrifugal pump), power consumption direct current ("DC"), pressure boost, pressure drop, pressure drop normalization factor, pressure drop percent change due to membrane conditions, pressure drop percent change due to operating conditions, recovery, returned activated sludge ("RAS"), rotational speed, running hours since last cleaning, running hours since last replacement, salt passage, salt passage normalization factor, salt passage percent change due to membrane conditions, salt passage percent change due to operating conditions, sludge retention time ("SRT"), sludge volume index ("SVI"), specific energy consumption (reverse osmosis), time since last cleaning, time since last replacement, variable frequency drive ("VFD") percentage, wasted activated sludge ("WAS"), water produced since last cleaning, water produced since last replacement, weekly energy consumption, weekly production, weekly running hours, weekly uptime and weekly water treated.

Virtual instrumentation data 170 can include any functionality of an instrumentation data 118. Since a virtual instrument 165 can be a virtual representation of any physical instrument 18, virtual instrumentation data 170 will accordingly correspond to the type of data for that virtual instrument 165. For example, when a virtual instrument 165 is a flow rate sensor, the corresponding virtual instrumentation data 170 will be a flow rate sensor data. Similarly, when a virtual instrument 165 is a pressure sensor, its corresponding sensor data will be a pressure sensor data. Virtual instrumentation data 170 can include a location and type of an instrument 18 that it represents, including its type and model, internal settings, configurations and any other features identified for a physical instrument 18.

Virtual instrumentation data 170 can include any data that would have been taken by a physical instrument 18 of a particular model at the location at which the virtual instrument 165 is placed. For example, if a virtual instrument 165 is a temperature gauge at some location, the virtual instrumentation data 170 can include temperature readings at that location. If the physical instrument 18 of that particular model would be set to take measurements 119 periodically, then the virtual instrumentation data 170 can take measurements periodically, as well.

Virtual Data Generator 160 can include any combination of hardware and software, including scripts, software functions and code to create or generate virtual instruments 165 and determine their corresponding virtual instrumentation data 170. Virtual data generator 160 can generate one or more virtual instruments 165 anywhere in the model 135. For example, virtual data generator can identify one or more locations in which instruments 18 are missing and can generate one or more virtual instruments 165 at those locations. The generated virtual instruments 165 can be of any type, and can be based on, or mimic any instruments 18A-N.

Virtual data generator 160 can include any functions, scripts and computer code for determining virtual instrumentation data 170 for any virtual instrument 165. Virtual data generator 160 can determine virtual instrumentation data 170 per event, periodically, or at set times. Virtual data generator can determine virtual instrumentation data 170 for a virtual instrument 165 by performing mathematical functions on one or more instrumentation data 118 for one or more physical instruments 18 at the plant 10. For example, virtual data generator 160 can determine virtual instrumentation data 170 of a virtual pressure sensor 165 by performing mathematical functions on instrumentation data 118 for one or more physical pressure sensor instruments 18A-N. For example, virtual data generator 160 can determine virtual instrumentation data 170 by calculating an average, a median, or a mode of two or more readings in the instrumentation data 118 from two or more physical instruments 18 at the plant. Virtual data generator 160 can determine virtual instrumentation data 170 by determining a trend of the instrumentation data 118 and finding a function that most closely maps the instrumentation data measurements 119 over time. Virtual data generator 160 can then extrapolate from the data using the closest-fit function and thereby predict future readings of the virtual measurements 119.

Virtual data generator 160 can determine virtual instrumentation data 170 by finding a relationships or correlations between various instrumentation data 118 from different instruments 18A-N. For example, a virtual data generator 160 can determine that there is a correlation or a relationship between one or more temperature sensors instrument 18A and one or more salinity sensor instruments 18B. The virtual instrument 165 for sensing salinity in a fluid can then can determine its salinity based at least in part on the measurements 119 from a temperature sensor instrument 18. Similarly, a virtual data generator 160 can determine that there is a relationship or a correlation between data of two or more instruments 18 measuring pressure at a fluid at the input into a filter and a flow rate of the output of the fluid through the filter. In such an example, a virtual instrument 165 for measuring flow rate through the filter can be determined or calculated, at least in part, based on the measurements 119 from a physical pressure sensor instrument 18 at the fluid input into the filter. Accordingly, virtual data generator 160 can use relationships or correlations between different sensor readings to generate virtual instrumentation data 170 at virtual sensors 165. To implement these calculations using such relationships, virtual data generator 160 can rely on the rules by the rules engine 140 to establish the relationships between different sensors, different components, different assets or different parts of the system or process.

Virtual data generator 160 can determine virtual instrumentation data 170 based on the location of virtual instrument 165 in relation to physical instruments 18 in the process being modeled. Virtual data generator 160 can, for example, calculate an average, a median or mode value of data from two physical pressure sensor instruments 18 to determine or calculate the pressure for a virtual instrument 165 located in between the two physical pressure sensor instruments 18. Virtual data generator 160 can, for example, calculate an average, a median or mode value of data from two physical temperature sensor instruments 18 to determine or calculate the temperature for a virtual instrument 165 located in between the two physical temperature sensor instruments 18. Similarly, the virtual data generator 160 can calculate an average, a median or mode value of data from two physical fluid salinity sensor instruments 18 to determine or calculate the salinity for a virtual instrument 165 located in between the two physical salinity sensor instruments 18.

Figure 3A:
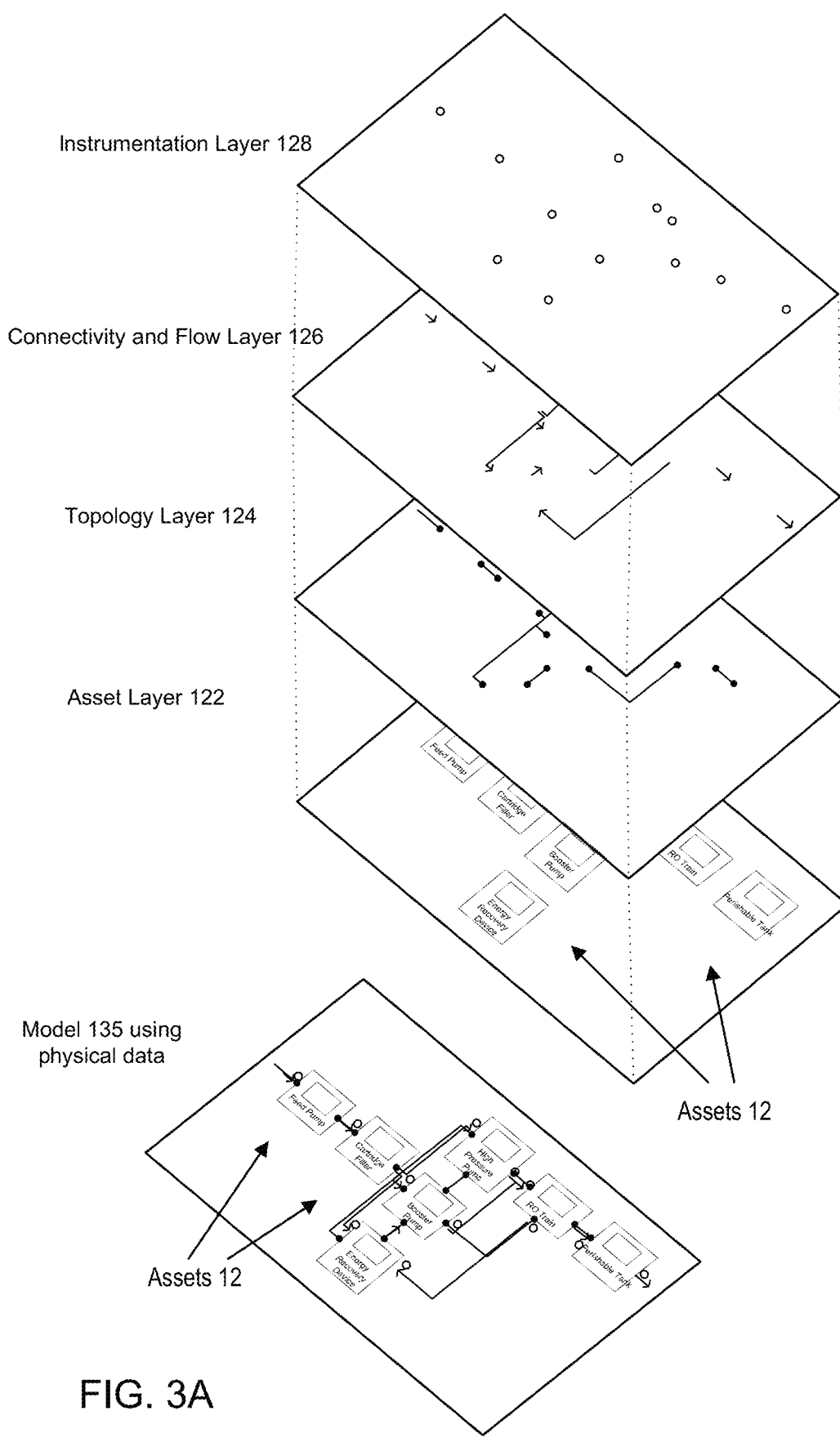
FIG. 3A is an illustration of an example of a multi-layer model that uses physical data.
Figure 3B:
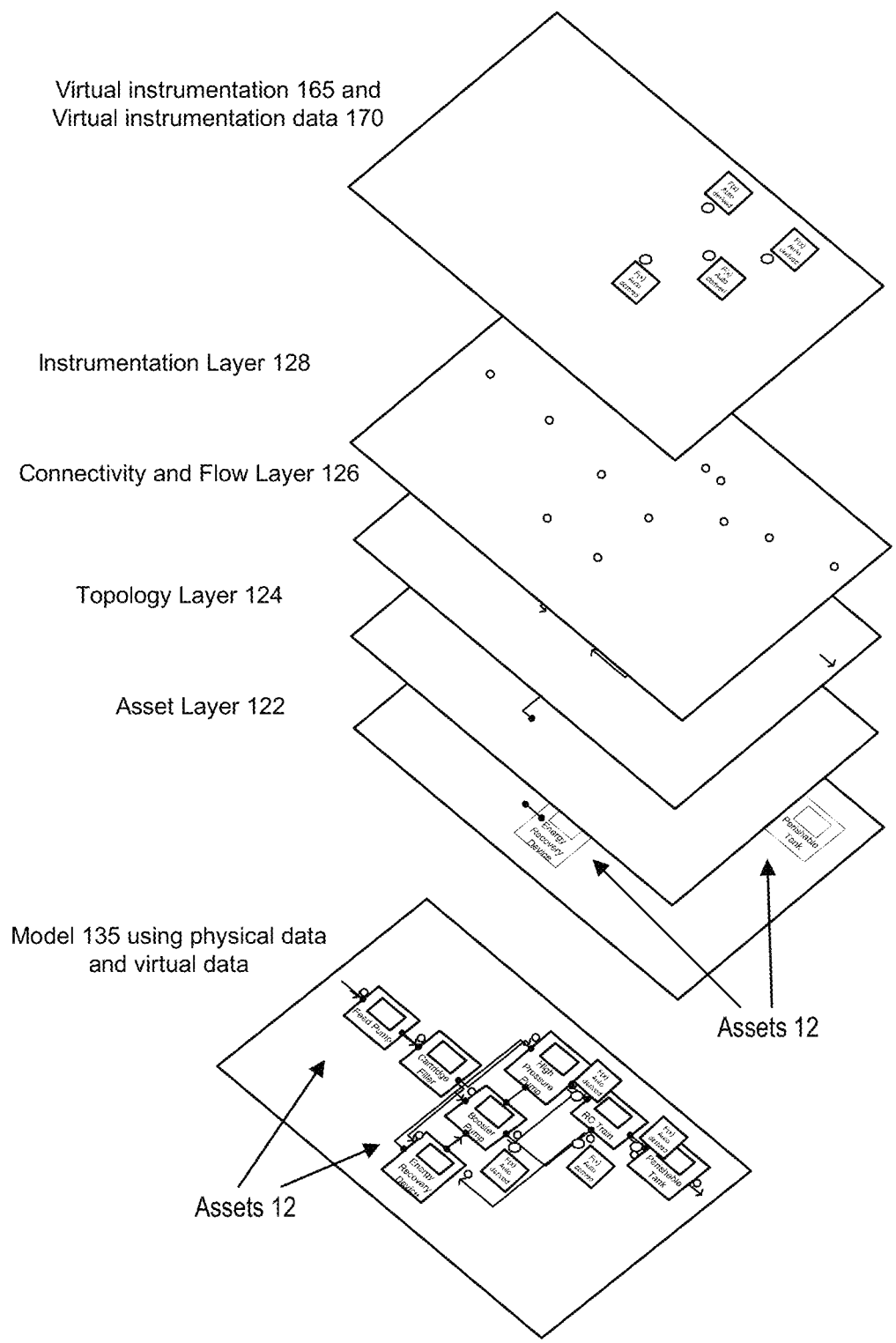
FIG. 3B is an illustration of an example a multi-layer model that uses physical and virtual data.

Virtual data generator 160 can generate a virtual layer for the model 135. The virtual layer can be similar to layers 122-128, as depicted in the examples of FIGS. 3A-3B. The virtual layer can include virtual instruments 165, their topology and arrangement with respect to other parts of the model 135, such as assets 12 for example. The virtual data layer can include relationships and functions with respect to the physical components, such as assets 12 or instruments 18, for example.

A rules engine 140 can include software, scripts and computer code to form and utilize rules for generating virtual instruments 165 and virtual instrument data 170. Rules engine 140 can utilize one or more rules to determine a set of relationships between different assets 12, instruments 18 and virtual instruments 165. Rules engine 140 can include rules on defining the relationships between connected assets, such that for example, the rule defines how input of one asset operates as function of an output of another asset, or how a process material output from one asset makes its way into another asset, or how material pumped by one asset (pump) is pressurized to flow through one or more pipes to other downstream assets, or how measurements 119 from o pressure instrument 18 affects the modeled rate of flow through an asset 12 where the instrument is located. Rule engine 140 can include or utilize a data structure that can indicate interaction and relationships between assets. The data structure can include fields, which can be populated by a user through a user interface. The rule engine 140 can then run the rules based on the user inputs to provide sets of relationships.

Rules engine 140 can include rules that dictate how particular connections facilitate operation between various assets. For example, rules engine 140 can include rules to describe how a pipe operates between an asset that is a water pump and another asset that is a water tank. Rules engine 140 can include rules to describe how pressure from one side of an asset affects or transfer to pressure on another side of an asset. Rules engine 140 can include rules that describe how temperature from one asset causes particular behavior of that asset, or other assets. Rules engine 140 can include rules that control the relationship between assets and the fluids or other materials they handle, between temperature and pressure of materials or fluids, between chemical composition and results, and so on.

Rules engine 140 can include functions and algorithms that are agnostic to the plant 10 and that automatically derive new information from the data in the plant database 110. Rules engine 140 can include aa domain specific language (DSL) and automatic solver system that can enable the plant-agnostic encoding of rules and automatic derivation of facts. A rule can include a concrete rule defining a plant-agnostic logical implication of interaction of assets or instruments. A fact can be auto-derived implementation of that rule at a specific plant.

For example, an engineer may specify a fact once, independent of a specific plant. This can include abstracting physical plants as a digital collection of assets, instrumentation, and connectedness and expressing laws as a function of these underlying plant agnostic resources. The solver can include a search engine over all possible facts that can be inferred, given the set of inference rules. The solver can sit atop the DSL and derive the parameter framework.

A rules engine 140 can include software, scripts and computer code to form and utilize rules to automatically generate new information, such as virtual instruments 165 and their corresponding virtual instrumentation data 170. Once generated, such new information can then be exposed for interface access. The rules engine 140 can implement automatic derivation of virtual data works by considering the system of types of assets 12, their associated physical instruments 18, and connectivity and flow data 116 and running these configuration details through a set of rules. These rules are plant agnostic rules that define how to automatically derive new information.

A rules engine 140, for example, includes plant agnostic law that may automatically generate virtual instruments 165 and their corresponding virtual instrumentation data 170 when appropriate conditions are met. For example, in the event that a model 135 is for a reverse osmosis ("RO") plant, if an asset 12 is of a particular type, namely a RO train, and if the asset 12 is measured by instruments 18 at its inlet and at its outlet, then the rules engine 140 automatically generates a virtual instrument 165 for the RO train for virtually measuring RO recovery.

A data processing system 100 or the rules engine 140 can auto-derive new information responsive to input properties and asset type information being satisfied. This can happen, for example, when a virtual instrument (or a physical instrument) that takes or calculates particular measurements is identified. The identification can be based on identifying an asset of the specific type in the system, particular plant industry type, or any other information.

FIG. 8 includes a table having information on various properties and parameters relating virtual instruments 165 and their associated virtual measurements 170, particular assets, process or industry types or inputs and outputs. The table in FIG. 8 can include input properties and asset type information that can be used to identify appropriate rules to run and auto-derive the new information by the rules engine 140. The input properties and asset type information can be used to identify a particular rule in the rules engine 140 that can be applicable to a particular combination of one or more of applicable assets, process types, input or output properties and KPIs. Responsive to identifying that one or more parameters in the table, including for example applicable assets, input properties or process types, match one or more rules in the rules engine 140, the rules engine 140 can select those rules as the rules to run to auto-derive new information. The rules engine 140 can trigger the one or more identified rules and run those one or more rules based on any combination of the one or more input data, including for example parameter inputs from FIG. 8. The KPIs identified by the rules engine 140 can be the KPIs offered to the user to select the KPIs in which the user is interested and declining the KPIs which the user does not want to use, such as for example illustrated in FIGS. 4D and 4E.

Model generator 130 can include the software, scripts and computer code to utilize the virtual instruments 165 and the virtual instrumentation data 170 the same way as the physical instrumentation data 118, discussed above. Model generator 130 can utilize virtual data generator 160 to include virtual instruments 165 into the instrumentation layer 128 along with the physical instruments 18 described in the instrumentation data 118. Model generator 130 can, together with virtual data generator 160, modify the model 135 to integrate virtual instruments 165 together with virtual instrumentation data 170. As model generator 130 and the virtual data generator 160 can be a combined generator function, they can operate as single function comprising the functionality of both.

Simulator 145 includes software, scripts and computer code to simulate the operation of the process modeled in the model 135. The simulator 145 can take the model 135 along with its layers 122-128 utilize the measurements 119 to simulate the operation of the model 135. For example, simulator 145 can take the model 135 that includes generated layers 122-128 from their corresponding data 112-118 and then input measurements 119 to determine the rate of operation of the model, the rate of operation of individual modeled assets 12, flow through various parts of the process, and so on.

Simulator 145 can include physics-based models for generating simulations. The simulation layer can expose control points to which simulation models can be interfaced. For instance, a model that varies operating conditions can be used to find an operating optimum. Also a model that simulates the process with a variety of different types of assets, including their different make and models in order to be able to suggest equipment retrofits. Other examples may include simulating to reduce chemical dosing or simulating to detect deviation from safe operating limits.

Resource Utilization Monitor 150 can include software, scripts and computer code to determine efficiency of utilization of assets 12. Resource utilization monitor 150 can comprise the functionality to determine the resource utilization of assets 12, either independently or in view of their efficiency, performance, throughput and other features. Resource utilization monitor 150 can determine how much longer each asset 12 of the model 135 can continue performing before their replacement or servicing is warranted. As assets 12 can have a duration of time during which they can be operated at some range of efficiencies, once their efficiency falls, their utilization can become costly. Resource utilization monitor 150 can utilize any information in the plant database 110 to monitor the utilization of the assets 12 over time. Once the asset utilization for a particular asset 12 falls below a particular threshold, resource utilization monitor 150 can determine that that it is more cost-effective to replace, provide maintenance or service the asset 12 than to keep operating it at the current rate. Resource utilization monitor 150 can make that determination with respect to a particular threshold of performance, efficiency, power consumption or throughput of the asset.

Alert Generator 155 can include software, scripts and computer code to generate an alert with respect to optimizing the process described in the model 135. For example, an alert generator 155 can generate an alert when one or more assets 12 is nearing its end of life. An alert generator 155 can generate an alert when one or more assets 12 are nearing its time of service or replacement. An alert generator 155 can generate an alert to indicate that one or more assets 12 can be reconfigured and can identify and recommend optimal services for the assets. For example, an alert generator 155 can determine that a RO membrane was serviced only once before and that it can be serviced again, instead of being replaced and generate an alert stating that the service is recommended over replacement. Accordingly, alert generator 155 can include information on particular way to service the asset. An alert generator 155 can generate an alert when one or more assets 12 can be reconfigured a particular way in order to optimize the process modeled by model 135.

An alert generator 155 can generate an alert that the asset has only a limited amount of throughput left before a next service of the asset. For example, an alert generator 155 can utilize a resource utilization monitor 150 to determine how much more processed material throughput an asset will be able to produce before the next service, maintenance, or replacement of the asset. An alert generator 155 can then generate an alert displaying the amount of remaining throughput for the asset before the asset is to be serviced or replace.

Alert generator 155 can include functionality to observe resource utilization monitor 150 and determine when an alert should be generated. Alert generator 155 can generate one or more alerts based on performance of one or more assets 12. An alert generator 155 can generate an alert when the resource utilization monitor 150 observes that an asset 12 consumes more energy than a particular predetermined level. For example, an alert generator 155 can generate an alert when an asset 12 begins to consume more energy for the amount of work completed than it has done in the past. This determination can be based on the instrumentation data 118 and measurements 119 or the virtual instruments 165 and virtual instrumentation data 170 that measure the energy consumption of the asset.

For example an alert generator 155 can generate an alert based on resource utilization monitor 150 determining that performance of an asset is below a particular threshold. The threshold can be set with respect to any asset performance level, such as for example: asset's usage of energy, asset's production throughput, asset's fluid flow, asset's production rate, asset's product quality, asset's output data, such as detection of particular characteristics in asset's product output, asset's sensor readings and asset's virtual instrumentation readings or data 170.

By monitoring the asset's performance or operation by the resource utilization monitor 150, the alert generator 155 can generate any notification when a set threshold is met or exceeded. For example, alert generator 155 can generate a notification that an asset is nearing the end of its efficient operation or that asset's service, maintenance or replacement is coming up. This can be done based on resource utilization monitor 150 detecting an amount of chemicals in the fluid output of the asset that exceeds a set threshold. Likewise, an alert generator 155 can generate a notification that an asset is nearing the end of efficient operation or the service, maintenance or replacement is approaching. This can be done based on a resource utilization monitor 150 detecting that the fluid pressure at the asset input exceeds a set threshold. An alert generator 155 can generate a notification that an asset is nearing the end of efficient operation or the service, maintenance or replacement is soon or approaching at a particular time in the future or within a particular time interval in the future. This can be done based on a resource utilization monitor 150 detecting that the one or more of a temperature of the asset or the power consumption of the asset exceeds a set threshold.

The data processing system 100 can combine features from various components and functions from FIG. 1 to perform digital twin modelling. For example, data processing system can use the simulator 145 to perform a simulation of the plant, such as plant 10, based on the set of relationships from rules engine 140 applied to the plurality of assets 12 in the model 135, one or more measurements 119 and one or more virtual measurements 170. The data processing system 100 can utilize alert generator 155 to generate a notification to service a particular asset 12 responsive to a comparison of a virtual measurement 170 with a threshold. The threshold can be determined based on a resource utilization monitor 150's estimate of utilization of a resource from continued performance of the same particular asset 12 without servicing that asset. The data processing system 100 can utilize alert generator 155 to determine the threshold based on resource utilization monitor 150's estimate of utilization of a resource from continued performance of the same particular asset without servicing the same asset.

For example, a data processing system 100 can receive the one or more measurements 119 from a particular physical instrument 18 of the one or more physical instruments located at or within a threshold distance of a particular asset 12A of the plurality of assets 12A-N. The data processing system 100 can determine, based on the set of relationships from the rules engine 140 and the one or more measurements 119 input into the model, a virtual measurement 170 for a virtual instrument 165 located at or within the threshold distance from an asset 12B, that is different than asset 12A and the alert generator 155 can generate the notification to service the second asset based such determination. The threshold distance can be any distance, such as within 1 m, 2 m, 5 m or 10 m from an asset, or within 0.1 m, 0.3 m or 0.7 m from the asset.

A data processing system 100 can use the model generator 130 to construct a first layer of the plurality of layers based on data on the plurality of assets at the plant, such as for example the asset layer 122 that can be constructed based on asset data 112. The model generator 130 can construct a second layer of the plurality of layers based on data on the topology of the plurality of assets at the plant, such as for example the topology layer 124 that can be constructed based on topology data 114. The model generator 130 can construct a third layer of the plurality of layers based on data on connections and flow path of the plurality of assets at the plant, such as for example the connectivity and flow layer 126 that can be constructed based on connectivity and flow data 116. The model generator 130 can construct a fourth layer of the plurality of layers based on data on the one or more physical instruments at the plant, such as for example the instrumentation layer 128 that can be constructed based on instrumentation data 118. The interface 15 of the data processing system can generate a display of the model comprising the first layer, the second layer, the third layer and the fourth layer.

For example, a data processing system 100 can receive the one or more measurements 119 of at least one of a flow rate of fluid, a salinity of fluid or a fluid temperature at or within a threshold distance from a first asset of the plurality of assets. The data processing system 119 can determine, based on the set of relationships by a rules engine 140 and the one or more measurements 119 input into the model 135, a virtual measurement 170 of at least one of the flow rate of fluid, the salinity of fluid or the fluid temperature at or within the threshold distance from the asset 12A or at or within the threshold distance from an asset 12B of the plurality of assets.

The data processing system 100 can use the simulator 145 to perform a simulation of a fluid processing plant at plant 10 based on the model 135, the set of relationships from the rules engine 140, one or more measurements 119 and a virtual measurement 170. The data processing system 100 can generate, responsive to a simulation by a simulator 145, the notification from alert generator 155 on efficiency of performance of the first asset or the second asset. The data processing system 100 can receive, second one or more measurements 119 for a second one or more physical instruments 18 located at a second plant 10 comprising a second plurality of assets 12 and determine, based on a second set of relationships from the rules engine on interactions between the second plurality of assets 12, a second virtual measurement 170 for a second virtual sensor 165 located at the second plant 10.

Figure 2A:
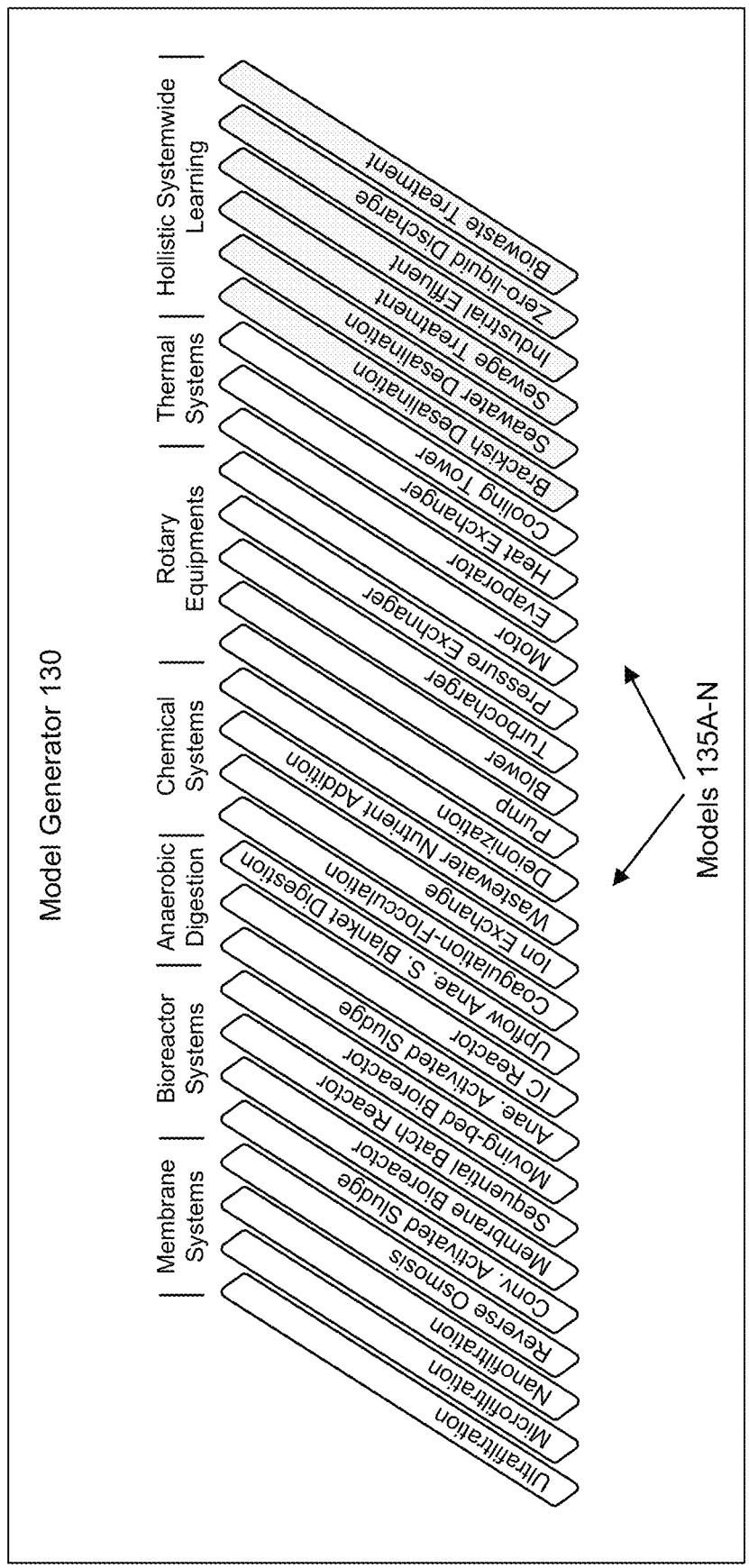
FIG. 2A is an illustration of an example of a model generator 130 comprising different models.

FIG. 2A depicts an example of a model generator 130 comprising or storing various different models 135 is illustrated. The model generator 130 can store models across various different industries, enabling the users from any such industries to create their models 135 independent from any other models 135. Using the multi-layer structure of the models 135, the data processing system 100 can abstract away various process or system specific details and apply the same model generating functionality across various different facilities 10 and industries. In doing so, model generator 130 can comprise or generate and operate models 135 from many disparate technologies and industries without requiring domain-based knowledge from such technologies and industries in order to create the model.

The model generator 130 can include or store models 135A-N that differ from each other based on different types of assets 12 that they include. The models can be organized or catalogued based on their types or key assets that they use.

For example, a model generator 130 can include membrane system models, such as ultrafiltration, microfiltration, nanofiltration and reverse osmosis models 135. The model generator 130 can include bioreactor system models, such as conventional activated sludge, membrane bioreactor, sequential batch reactor and moving-bed bioreactor models 135. The model generator 130 can include anaerobic digestion models, such as anaerobic activated sludge, internal circulation reactor, and upflow anaerobic sludge blanket digestion models 135. The model generator 130 can include chemical system models, such as coagulation-flocculation, ion exchange, wastewater nutrient addition and deionization models 135. The model generator 130 can include rotary equipment models, such as pump, lower, turbocharger, pressure exchanger and motor models. The model generator 130 can include thermal system models, such as evaporator, heat exchanger and cooling tower models. The model generator can include holistic system wide learning models, including brackish desalination, seawater desalination, sewage treatment, industrial effluent, zero-liquid discharge and biowaste treatment models 135.

As the data processing system 100 can be implemented as a cloud-base software as a service, various models 135 of disparate technologies and applications can be preloaded, allowing the users to use them as a general starting point which the user can specify and configure into models 135 specifically mimicking the actual plant 10 of their choice.

Figure 2B:
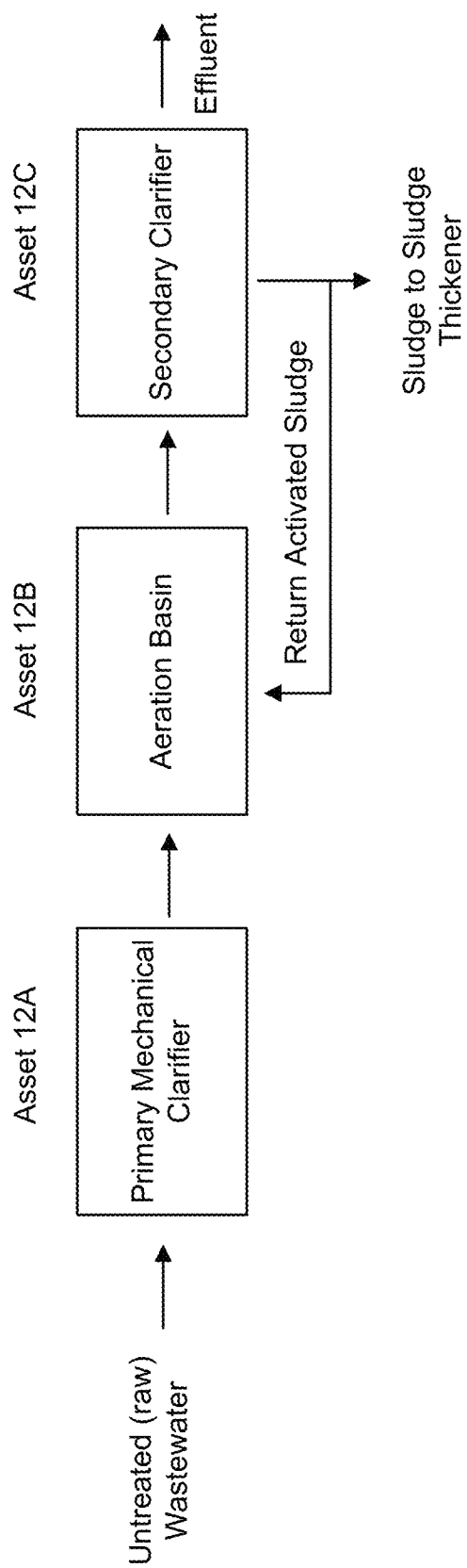
FIG. 2B is an illustration of an example of a flow diagram of a process to be modeled by the data processing system.

FIG. 2B depicts an example flow diagram of a process that can be modeled by a data processing system 100. FIG. 2B shows a flow diagram of an example pulp and paper (wastewater) process that can be implemented in a plant 10. The data processing system 100 can provide a digital twin model of the illustrated pulp and paper (wastewater) process by creating a model 135. The model 135 can utilize the information from the flow diagram to extract asset data 112 of the assets, the topology data 114 of the arrangement or connectivity and flow data 116 of the connectivity and flow between the assets 12 of the model 135.

In the flow diagram, an untreated (raw) waste water is input into a primary mechanical clarifier, which can correspond to an asset 12A of a model 135. The output flow from the asset 12A can be input into an aeration basin (asset 12B), from which it can be input into a secondary clarifier (asset 12C).

The asset 12C, being the last asset in the chain, has two outputs. The first output includes effluent water that is safe to be discharged into a river or the sea. The second output however includes a return activated sludge and goes either back into aeration basin (asset 12B) to be once again filtered by the second clarifier (asset 12C). The second output can include the sludge that cannot be further processed and that can be output to a sludge thickener.

FIG. 2B illustrates an example flow diagram that can provide some asset data 112 in relation to assets 12, some topology data 114 in relation to the arrangement of the assets and some connectivity and flow data 116, with respect to the flow of the process across the assets.

Figure 2C:
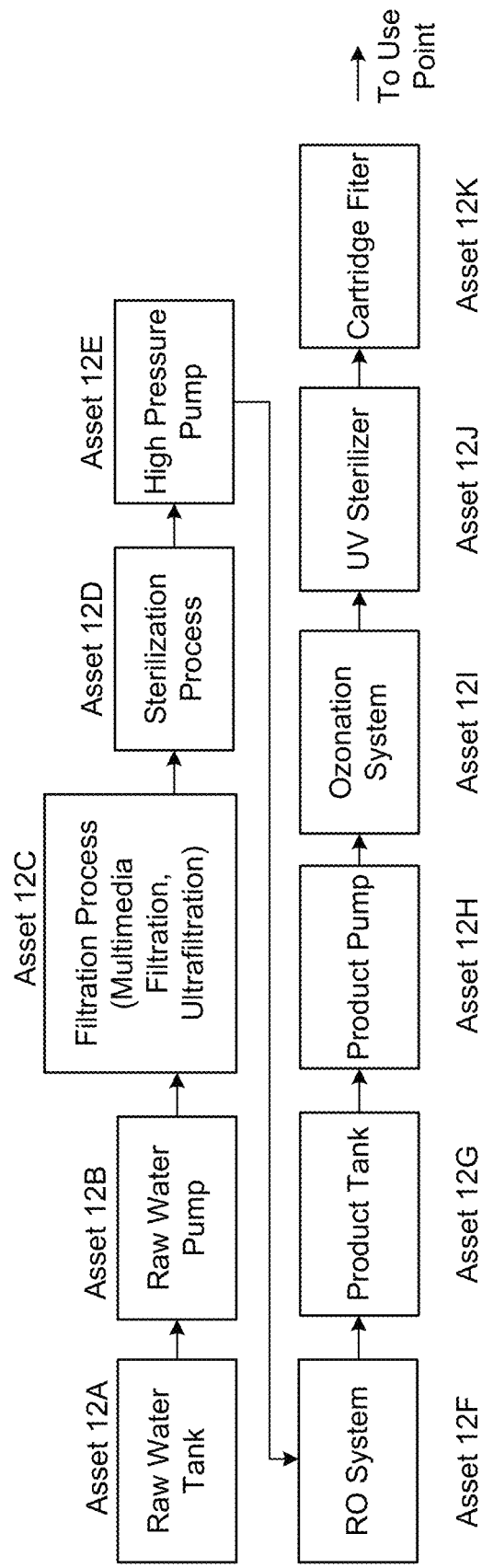
FIG. 2C is an illustration of another example of a flow diagram of a process to be modeled by the data processing system.

FIG. 2C depicts an example flow diagram of a flow diagram of a process that can be modeled by a data processing system 100 is illustrated. FIG. 2C shows a flow diagram of an example food and beverage process that utilizes a reverse osmosis (RO) system. The data processing system 100 can provide a digital twin model of the illustrated process by creating a model 135 that has eleven assets 12, their illustrated topology and connectivity and flow.

The example flow diagram begins with a raw water tank, which in a model 135 can be described as an asset 12A. The fluid that is output from the raw water tank is input into a raw water pump (asset 12B), the output of which can be fed into a filtration process that implements multimedia filtration or ultrafiltration (asset 12C). The output fluid from the filtration process can then go into a sterilization process (asset 12D), the output of which can go into a high pressure pump (asset 12E). The output from the high pressure pump can then be input into a Reverse Osmosis (RO) system (asset 12F), the output of which can then be fed into a product tank (asset 12G), the output of which can then be input into a product pump (asset 12H). The output from the asset pump can be input into ozonation system (asset 12I), the output of which can then be input into an ultraviolet (UV) sterilizer (asset 12J), the output of which can then be fed into a cartridge filter (asset 12K). The output from the cartridge filter can then finally be fed to the use point, which means it is ready for consumption.

The flow diagram of FIG. 2C relates to an illustration that can provide some plant database 110 data on the process to be modeled. The data can include asset data 112 on assets 12A-K, topology data 114 on the arrangement of assets and connectivity and flow data 116 showing the flow path of the material being processed.

Figure 3C:
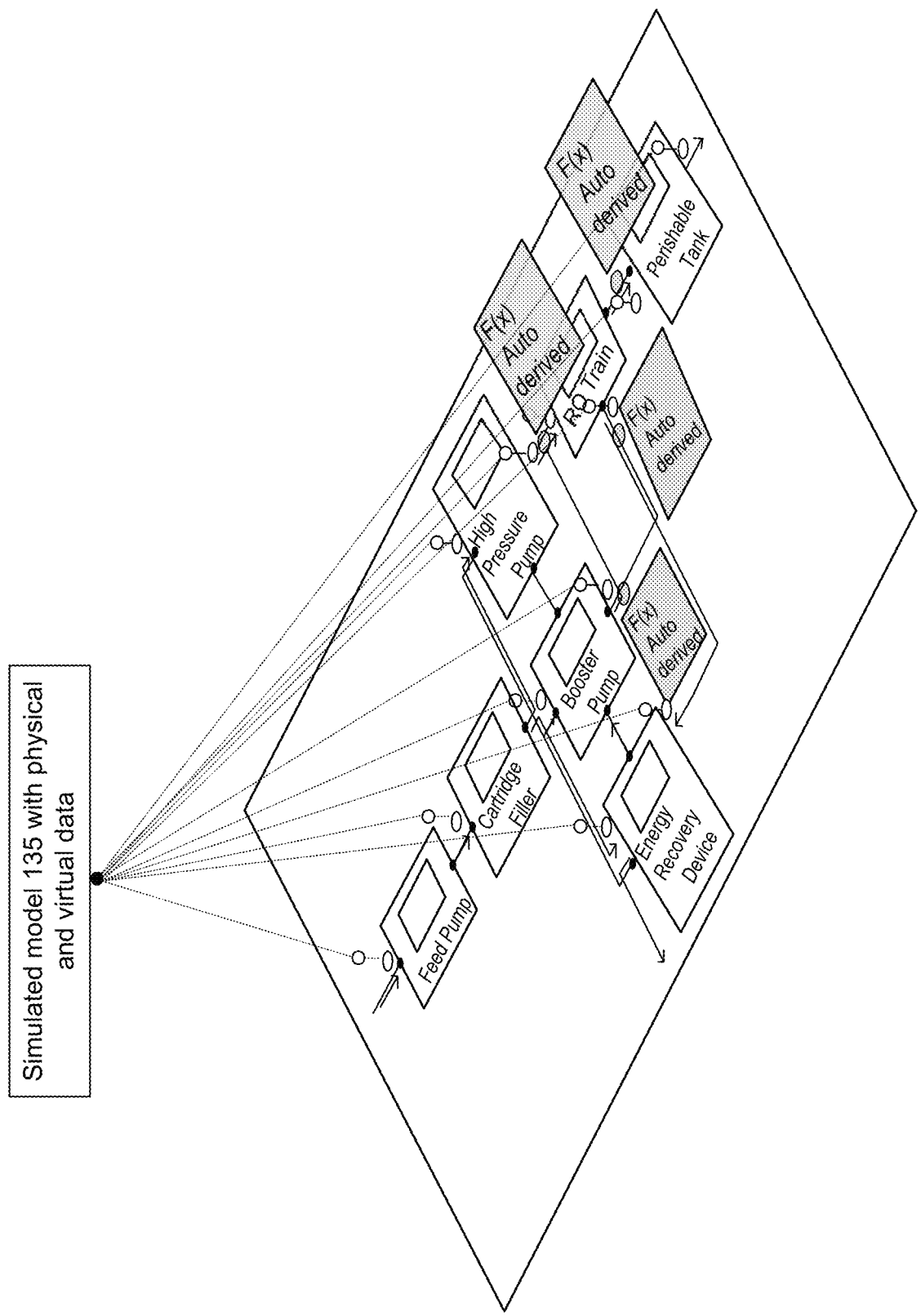
FIG. 3C is an illustration of an example of a simulated multi-layer model that uses physical and virtual data.

FIGS. 3A, 3B and 3C depict examples of a model 135 for a RO process that can be operated at a plant 10. While FIG. 3A illustrates an example model 135 of a RO process containing only the four layers 122-128 and their physical data and measurements, the FIG. 3B illustrates an example of a model 135 of the same RO process that includes not only the physical data, but virtual data as well. FIG. 3C on the other hand illustrates a close-up simulated model 135 from FIG. 3B with a greater level of detail. These three figures together help illustrate how data layers 122-128 form a model 135 and how virtual data improves the model, all of which can then be simulated by a simulator 145.

FIG. 3A depicts an example model 135 using only physical data from a plant database 110 is illustrated. FIG. 3A illustrates an asset layer 122 comprising seven assets 12 that are more clearly shown and identified in the related FIG. 3C, in which the assets are shown as: a feed pump, a cartridge filter, a booster pump a high pressure pump, an energy recovery device, a RO train and a perishable tank.

Vertically lined up with and standing above the asset layer 122 is topology layer 124. The topology layer 124 includes connecting lines describing the arrangement between the assets in asset layer 122. The arrangement is illustrated with lines having nodes at their ends, which can be used to denote the distance and direction between each of the assets.

Vertically lined up with the topology layer 124 and standing above it, is a connectivity and flow layer 126. The connectivity and flow layer 126 includes arrows indicating direction of the connections between the assets, thereby specifying in which direction the processed material, in this case fluid, is moving across or through the assets 12

Vertically lined up with the connectivity and flow layer 126 is the instrumentation layer 128. The instrumentation layer 128 includes circles denoting locations where physical instruments 18, such as sensors, are located with respect to the assets 12 in the model 135.

Combining all four layers 122-128 is the model 135 at the bottom of the FIG. 3A in which all four layers are incorporated into a single representation model of the RO process. Since the model does not include any virtual data, it is limited to only physical instrumentation data 118 and physical measurements 119. This model 135 can include a digital replica of the reverse osmosis (RO) process at the plant 10.

In contrast to FIG. 3A, FIG. 3B shows the same four layers 122-128 as in FIG. 3A, but including another layer of virtual data at the top. The virtual data layer can include the same layer functionality as the instrumentation layer 128, for example, except that it includes virtual instruments 165 and their virtual instrumentation data 170. The virtual layer can therefore comprise virtual instruments 165 disposed very similar to the way assets 12 are disposed in the asset layer 122, i.e. simply placed into their respective locations in which they would have existed had they been real instruments at the plant 10.

FIG. 3B illustrates an example virtual layer on top of the four layers 122-128 that includes four virtual instruments 165 along with their corresponding "f(x) derived functions" which denote functions for calculating the virtual instrumentation data 170. In particular, as more clearly depicted in FIG. 3C, all four virtual instruments 165 can be disposed in the vicinity of the RO train asset. One virtual instrument 165 can be disposed at the flow path between the fluid output of the booster pump and the input of the RO train. A second virtual instrument 165 can be disposed between the fluid output of the high pressure pump and the input of the RO train. A third virtual instrument 165 can be disposed at the flow path between the output of the RO train and the input into the energy recovery device. The fourth virtual instrument 165 can be disposed between the output of the RO Train and the input of the permeate tank. By placing these four virtual instruments 165 at these locations, the model 135 can acquires four more important data points that can help it better estimate the performance of the RO system.

Because the FIG. 3B includes the virtual data layer on top of the four layers 122-128, the corresponding model 135 includes both physical and virtual data. Accordingly, model 135 of FIG. 3B includes asset layers 122-128, and a set of virtual instruments 165 and their corresponding virtual instrumentation data 170. As illustrated in FIG. 3B, the virtual instrumentation data can be generated using mathematical functions based on physical instrumentation 118 and their corresponding measurements 119.

FIG. 3C depicts an example of a simulated model 135 that uses both physical and virtual data is illustrated. FIG. 3C shows a more-detailed version of a FIG. 3B model, along with the above-discussed four virtual instruments 165 and their corresponding virtual instrumentation data 170 that in this illustration are denoted as "f(x) auto derived" functions. Instrumentation data 170 therefore can include mathematical functions that automatically determine virtual instrumentation data 170 from physical instruments 18 and their corresponding physical measurements 119.

Figure 4B:
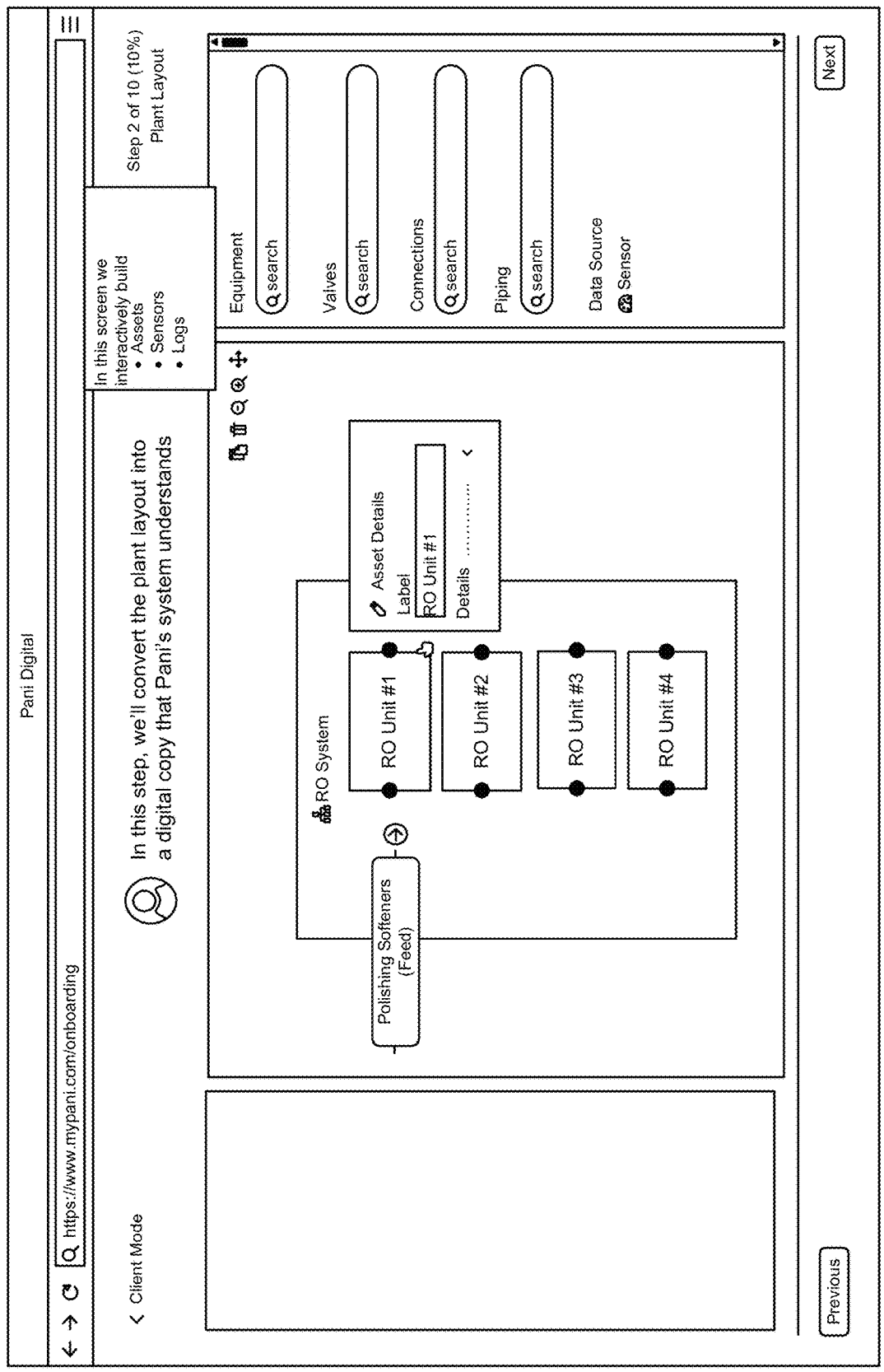
Figure 4C:
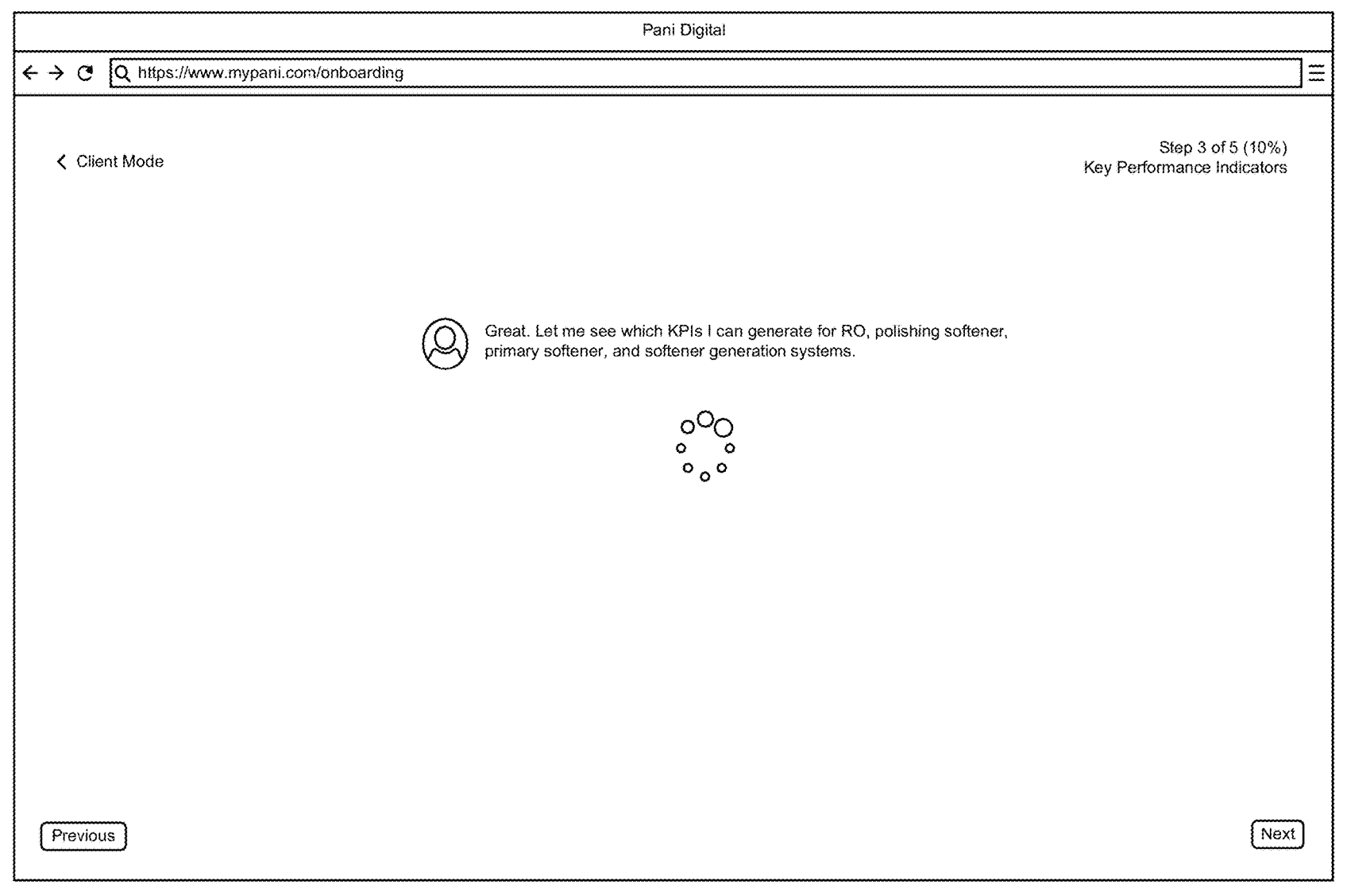
Figure 4D:
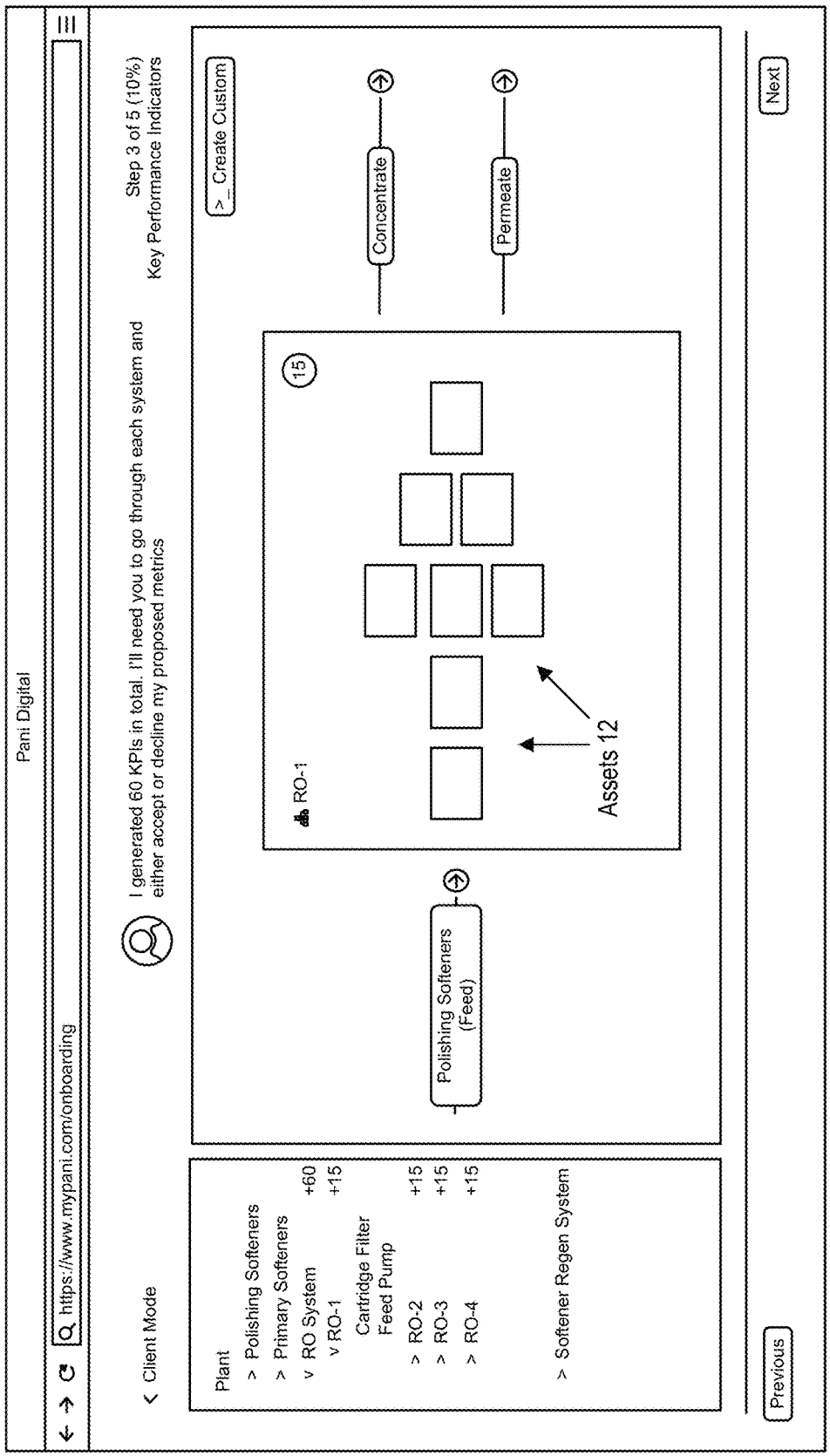
Figure 4E:
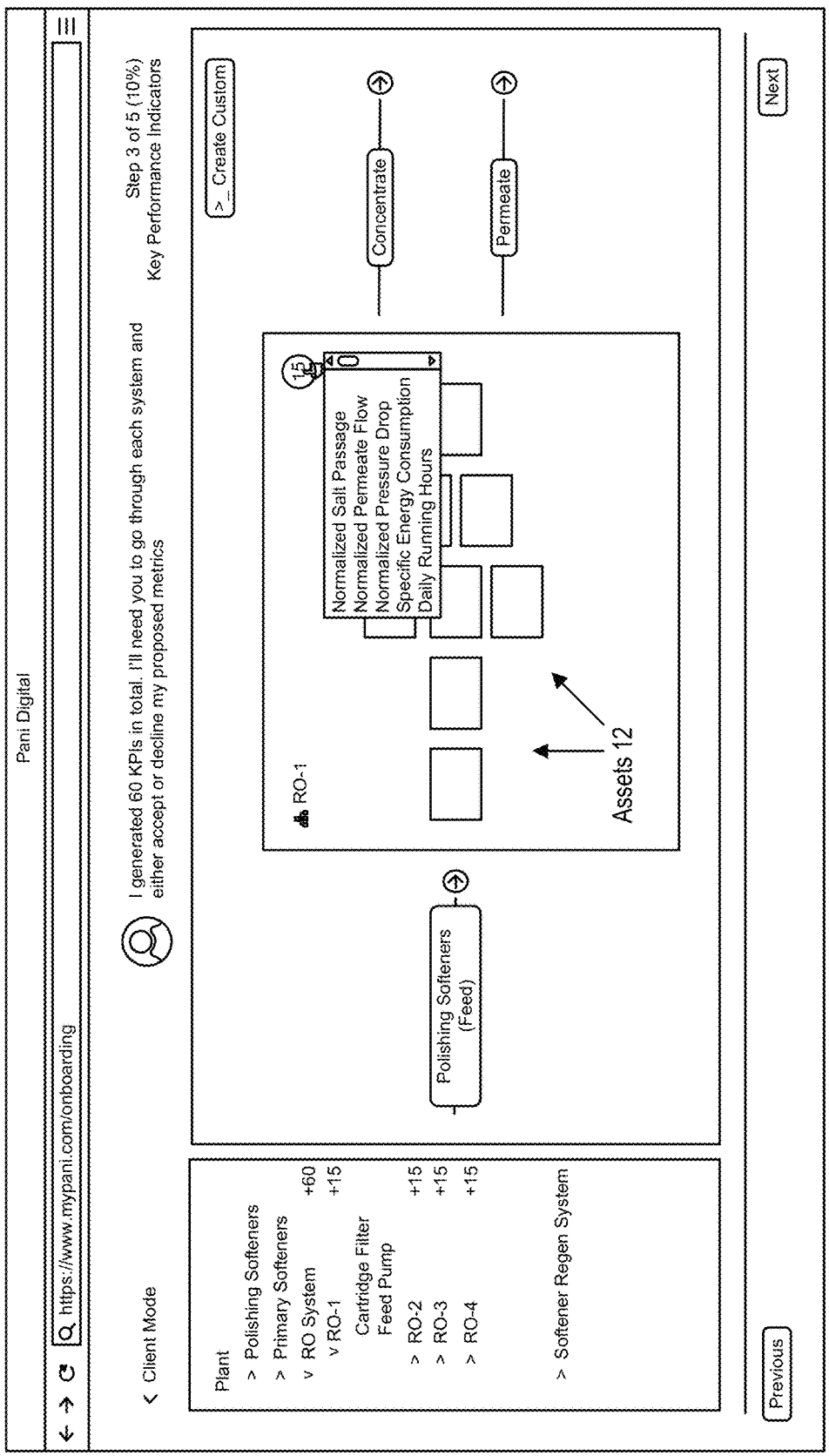

FIGS. 4A-4E depict example illustrations of an interface to set up and use the data processing system 100. FIG. 4A illustrates an example web interface window for a user to provide to the data processing system 100 information on the type or industry of the plant and its product tier. FIG. 4B illustrates an example web interface window for a user to provide to data processing system 100 information on the data for modeling the plant. FIG. 4C illustrates an example web interface window notifying the user that the data processing system 100 is generating key performance indicators ("KPIs"), which can include virtual instruments 165. FIG. 4D illustrates a an example web interface window notifying the user that the data processing system 100 has generated 60 KPIs on the illustrated model 135 and that the user can select which KPIs to keep. FIG. 4E illustrates an example web interface window for the user to select which KPIs to keep in the model to be generated by the processing system 100.

FIG. 4A depicts an example user interface window of a web-based interface 15 for setting up and running a model 135 over the network 101. The illustrated web-based interface 15 can include a web-based application for the user to access and use the data processing system 100 to set up or configure the model 135 over the internet. The illustrated window is titled Pani Digital and includes a universal resource locator ("URL") for the user to find the user interface 15 for the data processing system 100.

The illustrated window prompts the user for information. The prompted information is about the industry to which the plant of the system or process to be modeled belongs. Based on the identified industry to which the plant belongs, the data processing system 100 can decide which preconfigured models 135 to apply as a starting point and which KPIs can be useful for the finalized model 135. Illustrated choices for the industry of the plant include many different types of models 135 discussed in FIG. 2A for example, but the choices illustrated in FIG. 4A include: desalination, industrial wastewater and municipal wastewater. In this illustration the user can select desalination, for example.

The illustrated window also prompts the user for information on the product tier to which the plant has subscribed. These subscription options can align with product tiers, ranging from base, to brite to genius. A genius-level customer can receive more technically sophisticated features. The choices presented include base, brite and genius and the user the selects the genius option. The illustrated window notifies the user that the user can later come back and update the product tier when the plant upgrades.

In FIG. 4B, an example window of a user interface 15 shows select options for the user to configure the plant layout, including for example describing the process layout at the plant or plant 10. The window is designed to convert the plant layout into a digital copy that the data processing system understands. The example window of FIG. 4B provides the functionality for the user to input into the data processing system 100 assets 12 and instruments 18. The window can also enable the user to provide the data processing system 100 with logs, such as for example data logs that include instrumentation data 119.

In addition to the window's title and URL, the example window of FIG. 4B identifies a model 135 called "RO System." The data processing system 100 can identify and select for the user model 135 of the RO system based on the selections the user identified in FIG. 4A. For example, if the user selects a particular industry or tier of the system, such as for example, desalination industry and brite tier, the data processing system 100 can select and output one version of the RO system model 135. The data processing system 100 can also select and output a different a different version of the RO system model 135 based on user's selection of desalination industry and the genius tier at FIG. 4A.

FIG. 4B can also refer to an example web interface for the user to provide to data processing system 100 all information for generating a model 135. For example, the illustrated interfaced window can allow the user to input and set up assets 12 and instruments 18 as they exist in the plant 10. For example, the user can enter any plant database 110 data, including for example any asset data 112 for the assets of the RO system, topology data 114 for describing their arrangements, connectivity and flow data 116 for describing how the assets are connected and how the processed material, in this case fluid, is moved between the assets, and any instrumentation data 118 for the sensors and the measurements 119, such as the measurements in the sensor logs.

The illustrated window of the interface can also enable the user to select models of equipment used as each individual asset 12 and identify any valves used in the modeled system or process, including any model of such valves. The window can also enable the user to select physical instruments, such as sensors used in the modeled system or process. The illustrated model can enable the user to select the connections between the assets and the piping used. Using these options, the user can provide the data processing system 100 all of the asset data 112, topology data 114, connectivity and flow data 116 and instrumentation data 118. By enabling the user to select the logs, the window can also provide the data processing system with the measurements 119.

FIG. 4C illustrates an example window of the interface 15 in which the data processing system 100 notifies the user that while it is generating the model 135 it is also determining which KPIs to generate for the model. For example, data processing system 100 can have preconfigured models of various plants and can determine key locations in which KPIs can be placed. KPIs can include, for example, any physical instruments 18 if they happen to be at the correct location and measuring the correct thing as the KPI. If however, no instrument exists at a location at which a particular feature should be measured, then the KPI can include a virtual sensor or instrument 165. In doing so, the data processing system 100 can determine any potential locations for KPIs.

In the example interface window illustrated in FIG. 4D, the window notifies the user that the data processing system 100 has generated 60 KPIs for the model 135 it created. The window prompts the user to go through each of the KPIs and accept or decline them. The window also shows the generated model 135 which includes assets 12 that are arranged similarly as in the RO system model in FIGS. 3A-3C. The model has one input called polishing softeners (feed) and two outputs a concentrate and a permeate output.

FIG. 4E illustrates an example interface window that shows the generated model 135 from FIG. 4D along with the same notification that the data processing system 100 has generated 60 KPIs that the user can accept or decline. The window in FIG. 4E includes functions for configuring the given KPIs. For example, the user can select a KPI and determine if the KPI will measure, for example, a normalized salt passage, a normalized permeate flow, a normalized pressure drop, a specific energy consumption or daily running hours. Depending on the user selection, the model 135 can monitor all of them as well as any other functionality discussed here.

FIG. 5 depicts an example method 500. Method 500 can be implemented by data processor system 100 illustrated in FIG. 1 with the help of any technical features in FIG. 7 or any other feature or component described anywhere herein. At a high level method 500 includes a step 502 at which a data processing system 100 provides a graphical user interface enabling a user to configure a model of a system or a plant to be generated by model generator 130. At ACT 504, data processing system 100 loads historical data, including for example, spreadsheets with data for one or more sensor instruments 18. At ACT 506, data processing system establishes a live data connectivity to enable direct data connection to the plant 10, over a network 101 and including, for example, via one or more cloud functionalities. At ACT 508, data processing system can process the plant information and derive new, virtual information as a function of the plant configuration. At ACT 510, data processing system 100 continues to process the digital twin functionality to keep updating the model 135 based on streamed updated data.

At ACT 502, an interface 15 of a data processing system 100 provides a graphical user interface. The graphical user interface can include, for example, the interface features illustrated in FIGS. 4A-4E. At ACT 502, a model 135, such as for example the illustrated Digital Twin level 1 (DT1), can be configured using the plant's piping and instrumentation diagrams (P&IDs), process flow diagrams ("FDs), plant operation procedures and equipment data sheets. The configuration can be completed by the user. For example, a user of the data processing system 100 can use equipment data sheets to specify or select assets 12. The user can use P&IDs or PFDs to specify the assets' topology in the system or process being modeled. The user can also use the P&IDs and PFDs to specify the connectivity and flow between the assets 12. The user can also utilize P&IDs to identify and specify the physical instrumentation, such as sensors, deployed in the plant 10.

At ACT 504, data processing system 100 loads historic instrumentation data measurements 119. For example, a model generator 130 can load historical measurements 119 via an interface 15 with user's inputs or user provided files. The loaded instrumentation measurements 119 can include historic data of any number of physical instruments 18 at the plant 10. Historic data can be keyed by tag identifiers. For example, in step 502, a user may have a specific tag, FT-101. Uploading a spreadsheet which contains data for this tag will map this historic data to said instrument 18, such as a sensor in the system. As such, the historic data of a particular physical instrument 18 at plant 10 can remain associated with that instrument 18.

At ACT 506, interface 15 of the data processing system 100 establishes a live data connectivity with plant 10. Established live data connectivity can enable installation or configuration of one or more internet-of-things (IoT) devices and establish a direct data connection to the cloud via a supported data exchange protocol, such as for example a message queuing telemetry transport (MQTT) or representational state transfer (REST) protocols.

At ACT 508, the data processing system 100 can execute the "fact" auto-derivation to have the model generator 130, acting as a digital twin engine, process the plant information and derive the new information as a function of the plant configuration. For example, model generator 130 can process the information in plant database 110 and generate an updated model 135. The model generator 130 can utilize a virtual data generator 160 to generate virtual instrumentation 165 and calculate its virtual data measurements 170. Model generator 130 can receive new real-time measurements 119 for one or more sensors, and in response to the new real-time measurements 119 update the model 135 and recalculate the virtual measurements 170.

At ACT 510, the data processing system 100 runs the digital twin model 135 that continues to process incoming streaming data and keeps all derived process intelligence. This can include, for example, the virtual measurements 170, which can be continuously updated as the new physical data measurements 119 are being received. Model generator 130 can continuously run the model 135 in response to new real-time data updates from physical instruments 18. The virtual data generator 160 can simultaneously recalculate the virtual measurements 170 in response to the new real-time data.

Figure 6A:
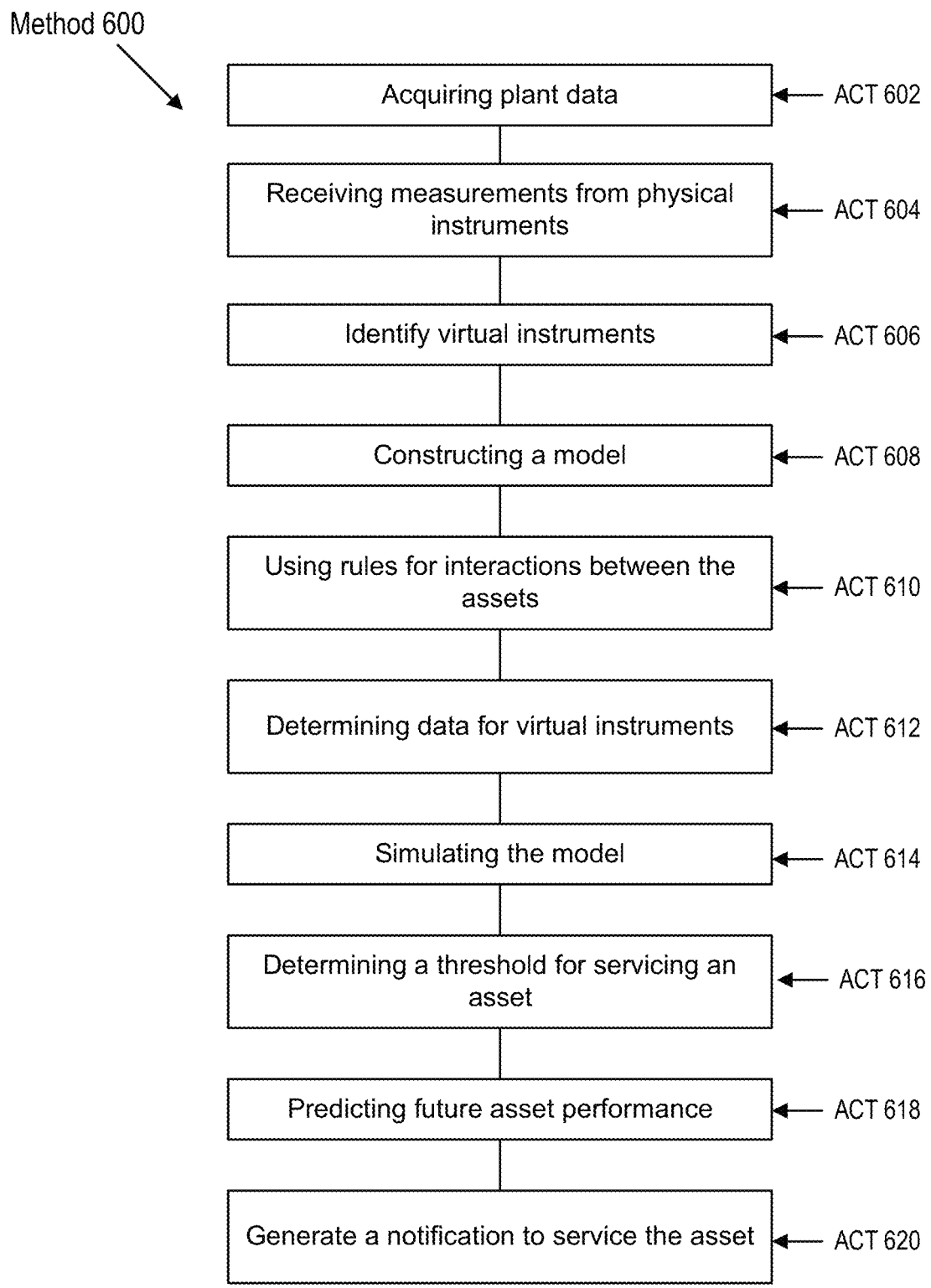
FIG. 6A is an illustration of an example a method for constructing and using a model.

FIG. 6A depicts an example method 600. Method 600 can be implemented by a data processing system 100 of FIG. 1, alone or with the any of the features of the FIG. 7 or any other components described herein. At ACT 602 a data processing system 100 can acquire plant data. At ACT 604, data processing system 100 can receive measurements from physical instruments 18. At ACT 606, data processing system 100 can identify virtual instruments 165. At ACT 608, data processing system 100 can construct the model 135. At ACT 610, data processing system 100 can use rules for interactions between the assets from the rules engine 140. At ACT 612, data processing system 100 can determine data for virtual instruments 165. At ACT 614, data processing system 100 can simulate the model 135. At ACT 616, data processing system 100 can determine a threshold for servicing an asset. At ACT 618, data processing system 100 can predict future performance of an asset. At ACT 620, data processing system 100 can generate a notification to service the asset.

At ACT 602, data processing system 100 can acquire any data of a plant 10. For example, data processing system 100 can acquire any one or more of asset data 112, topology data 114, connectivity and flow data 116 and instrumentation data 118. Data processing system 100 can also acquire measurements 119 from any instruments 18A-N at plant 10. For example, an interface 15 of the data processing system 100 can receive data from plant 10. Acquired data can include any information on assets 12 and their specifications, functionalities, performance, inputs and outputs, throughput and efficiencies, resources utilized such as the electrical power or gas or any other information to develop, configure or specify the models of assets 12 in the model 135. Acquired data can include any information on the connectivity, connections and instrumentation 18 to be modeled in the model 135, including their specifications, sizes, shapes, performance characteristics, throughput, functionalities, efficiencies and any other information for their modeling within the model 135.

A data processing system 100 can receive user selections from an interface 15, where the user selects one or more descriptions of the system or a process operating at the plant 10. For example, the user can select an industry of the system or process to be modeled, a type of a system or process to be modeled, the complexity level of the system or process to be modeled, functionality of the system or process to be modeled or any other feature or characteristic of the process or system operating at the plant 10. Responsive to such user selections, data processing system 100 can load from a plurality of preconfigured models 135 stored at the model generator 130 a particular model 135 that corresponds to the user's description. Data processing system 100 can receive selections or descriptions of asset data 112, topology data 114, connectivity and flow data 116, instrumentation data 118 or measurements 119 from user selections at the interface 15. Data processing system 100 can acquire at least some of the received data via a network 101, or from one or more user inputs or selections, such as those illustrated FIGS. 4A-4E.

At ACT 604, data processing system can receive measurements 119. The measurements 119 can be any measurements or data from physical instruments 18 at the plant 10. Data processing system 100 can utilize the interface 15 to acquire measurements 119 as a user's input. Data processing system 100 can include past measurements 119, such as for instance one or more files of data comprising series of past sensor readings form instruments 18. Data processing system 100 can load the history data of the measurements 119 from any number of instruments 18 through files, scripts or spreadsheets having such data. The data processing system 100 can receive measurements 119 through a stream of data from the interface 15 of the plant 10. For example, measurements 119 can include real-time sensor data, which can be received over the network 101. Data processing system 100 can receive measurements 119 comprising a plurality of measurements for each of a plurality of physical instruments at the plant 10.

At ACT 606, data processing system 100 can identify virtual instruments 165 to include into the model. Identified virtual instruments 156 can be, for example, one or more KPIs, such as the KPIs discussed in connection with FIGS. 4A-4E, or anywhere else herein. Data processing system can identify virtual instruments 165 in response to identifying the type of the system or process at the plant 10. For example, virtual instruments 165 can be identified in response to the user descriptions of the system or process to be modeled at ACT 602. Virtual instruments 165 can also be identified in response to identifying the model 135. For example, a data processing system 100 can identify a model 135 based on user's descriptions of the system or process at the plant 10, and the identified model 135 can include a set of predetermined virtual instruments 165. The data processing system 100 can then allow the user to select the virtual instruments 165 to keep or decline.

At ACT 608, data processing system 100 can construct a model 135. A model generator 130 can construct the model 135. The model generator 130 can construct the model 135 based on the user selections describing the system or process at the plant 10 at ACT 602. The model generator 130 can construct the model 135 based on any one or more data from plant database 110. For example, the model generator 130 can construct a model 135 based on any one or more of asset data 112, topology data 114, connectivity and flow data 116 and instrumentation data 118. The model generator 130 can construct the model 135 based on measurements 119.

The model generator 130 can construct model 135 by constructing the layers 122-128 and then lining them up vertically, such as for example in FIGS. 3A-3C. When the layers 122-128 line up vertically, the model generator 130 can combine the layers 122-128 to construct the model 135. The model generator 130 can use any combination of one or more layers of the asset layer 122, topology layer 124, connectivity and flow layer 126 and instrumentation layer 128 to construct the model. The model generator 130 can construct the model to include a layer of virtual data. The layer of virtual data can include virtual instruments 165 and virtual instrumentation data 170. The layer of virtual data can also be lined up vertically as layers 122-128 and combined to construct the model 135 that comprises virtual instrumentation 165 and its data 170.

At ACT 610, data processing system 100 can use rules to specify interactions between assets of the model 135. The model generator 130 can construct the model 135 based on execution of rules from the rules engine 140 that describes the operation of the model 135. The rules can specify how assets connect to each other, how fluid or any other material processed by the assets flows or moves from one asset to the next, the rate at which the process material moves and the power consumption for such operations. The rules can specify one or more physics-based properties, such as for example the physics of the fluid flow through the model 135, relationship between the volume, temperature and pressure of a fluid in a given space, relationship between mass, acceleration and force, relationship between velocity, time and distance. Rules can also reference the specific type of asset, the quality characteristic of a time-series signal (raw, cleaned), the specific properties of the time series signal (flowrate, conductivity, temperature, pH), the material properties of the plumbing (or medium) that connects the assets and the variation in altitude between connected assets.

At ACT 612, data processing system 100 can determine data for virtual instruments. A data processing system 100 can first identify virtual instrumentation 165 and then determine the virtual instrumentation data 170. Data processing system 100 can identify and place one or more KPIs in one or more locations of the model 135 and determine their virtual data 170.

Virtual instrumentation data 170 can be determined by determining its value from calculations that are based on instrumentation measurements 119. For example, virtual instrumentation data 170 can be calculated using a formula for efficiency of an asset and inputs from the instrumentation data 119. Virtual instrumentation data 170 can be determined by using a formula for performance of a RO membrane using one or more sensor measurements 119 that surround the membrane. For example, virtual instrumentation data 170 can be determined based on fluid inlet pressure, fluid outlet pressure, fluid temperature, fluid salinity or any other measurements 119 described herein.

At ACT 614, data processing system 100 can simulate the model. Simulator 145 can simulate the model 135 based on the rules from the rules engine 140. Simulator 145 can simulate the model 135 based on the physical measurements 119. Simulator 145 can simulate the model 135 based on the virtual instruments 165 and the corresponding virtual instrumentation data 170. The simulation can illustrate how the system or process being modeled in model 135 operates, including the operation of the individual assets, their individual throughputs, efficiencies, power consumption and rate of operation.

At ACT 616, data processing system 100 can determine a threshold for servicing an asset. The resource utilization monitor 150 can determine the threshold for servicing an asset based on any one or more of: usage data of an asset, duration of time since the asset was last serviced or replaced, condition of the asset, amount of time the asset has been in operation, performance of the asset, efficiency of the asset, energy consumption of the asset, quality of performance of the asset, configuration of the asset, settings of the asset or any other features of an asset 12 discussed herein.

The threshold may be the recommended threshold for operating an asset without a service. The threshold may be a threshold beyond which operating the asset may be more costly than stopping production or service and servicing the asset. The threshold may be a threshold beyond which asset operation will provide diminishing returns for the user. The threshold may be a threshold beyond which the asset will not perform at a desired or recommended performance, speed, efficiency, throughput or quality. The threshold may be any threshold of acceptable performance, quality of production or efficiency below which the asset should not perform. The threshold may include any threshold below which the continued operation of the asset will incur more cost than generate revenue, given the diminished efficiency, throughput, quality of output or performance. The threshold may also be any threshold discussed herein.

At ACT 618, data processing system can predict future performance of a particular asset in the model. Simulator 145 can predict future performance of a particular asset based on historical measurements 119. Simulator 145 can predict the future performance of a particular asset based on a real-time measurements 119. Simulator 145 can determine future performance of an asset based on the trend of asset related physical instrumentation measurements 119 over time. For example, simulator 145 can determine future asset performance by determining that asset's performance has been changing over time. Simulator 145 can determine future asset performance by determining that asset's power consumption has been changing over time. Simulator 145 can determine future asset performance by determining that asset related measurements 119 have been changing over time, such as for example pressure measurements, temperature measurements, permeation measurements, measurements of concentration of particular substances or molecules, or any other measurements 119 described herein. Simulator 145 can work together with a resource utilization monitor 150 to determine resource consumption, power consumption, and performance of the asset over time. Simulator 145 or resource utilization monitor 150 can take determined changes in the instrumentation measurements 119 over time and extrapolate their values into the future to determine where those values will be in the future. Resource utilization monitor 150 or Simulator 145 can then determine that resource utilization of the asset in the future will exceed a threshold.

At ACT 620, data processing system 100 can generate a notification to service the asset. Alert generator 155 can generate a notification to service the asset based on the future data for performance determined at ACT 618 falling beyond the threshold determined at ACT 616. Alert generator 155 can generate a notification to service an asset by requiring asset's service by a service professional, such as an equipment technician or equipment field engineer. Alert generator 155 can generate a notification to replace the asset. Alert generator 155 can generate a notification that states the time in the future when the asset will have to be serviced. For example, alert generator 155 can generate a notification a month before the asset is to be serviced to alert the user to schedule a timely asset service. Alert generator 155 can thereafter send one or more timely reminders to remind the user to schedule the service at the stated time in the future.

Alert generator 155 can generate the notification to service the asset at a time in the future based on resource utilization monitor 150 determining that asset performance will fall below the threshold at ACT 616. For example, resource utilization monitor can determine the asset's threshold for acceptable power consumption, efficiency or performance. The alert generator can generate the notification based on the simulator 145 determining that asset performance will fall below the threshold at a particular point in the future. The alert generator 155 can alert the user of the particular point in the future when the asset will have to be serviced. The notification can include description of the desired service, such as a cleaning, oil change, parts change, parts replacement or entire asset replacement.

Figure 6B:
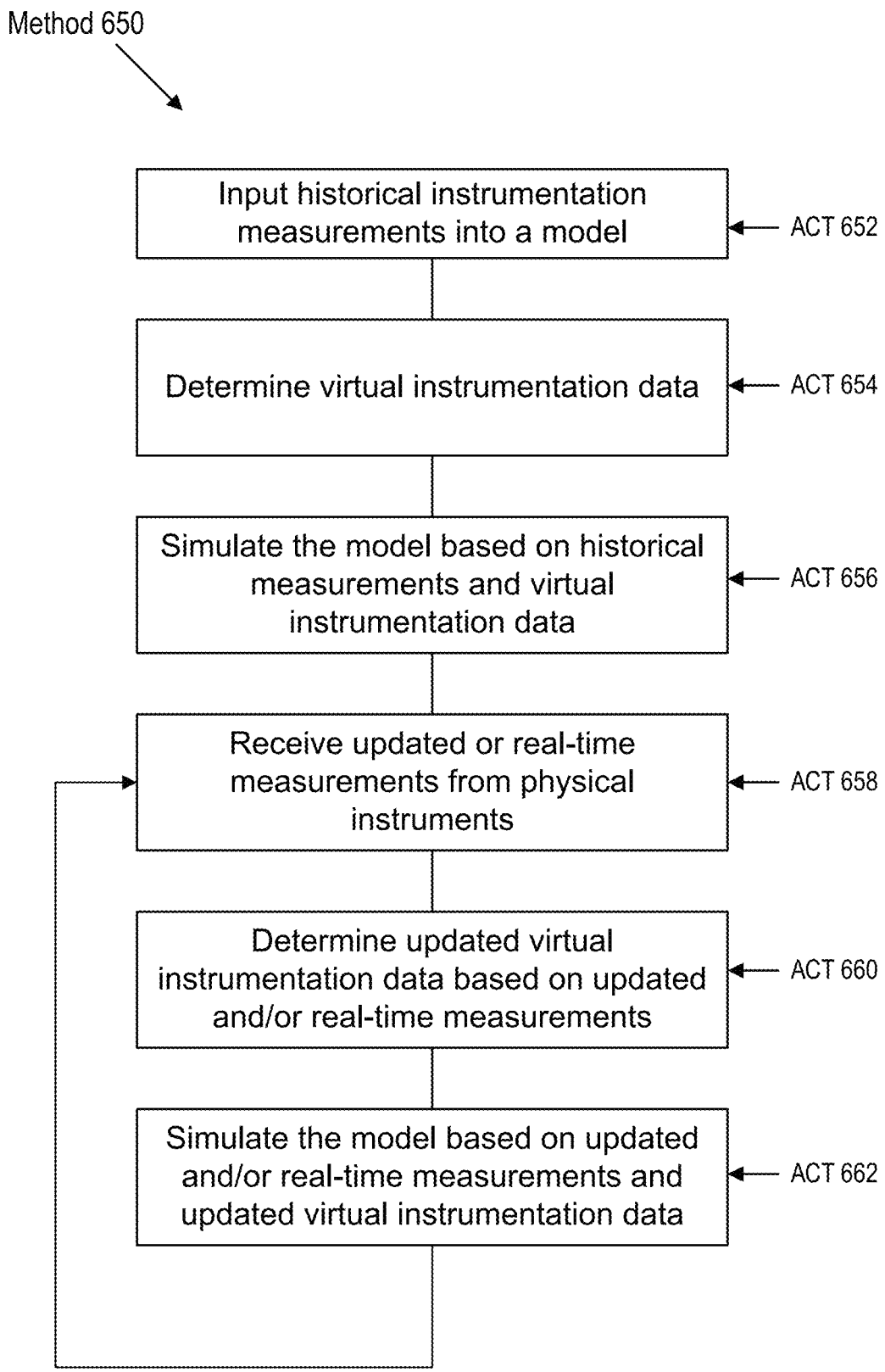
FIG. 6B is an illustration of an example a method for using a model with real-time data.

FIG. 6B depicts an example method 650. Method 650 can be implemented by a data processing system 100 of FIG. 1 or any other components or features described herein. In a brief overview, method 650 includes step 652 data processing system inputs historical data of physical measurements into a model 135. At ACT 654, virtual data generator 160 determines virtual instruments and virtual instruments data 170. At ACT 656, simulator 145 generates an estimate of future plant performance based on the simulated model of the historical data. At ACT 658, data processing system 100 receives updated or real-time data from physical instruments 18. At ACT 660, virtual data generator 160 determines updated virtual instrumentation data 170. At ACT 662, simulator 145 simulates the model based on updated or real-time data and updated virtual instrumentation data 170. The steps 658-662 can form a loop to provide for a method of continued updating of a digital twin model and its physical and virtual data.

At ACT 652, data processing system 100 inputs into a model generator 130 historical data of measurements 119 from physical instruments 18 a plant 10. Data processing system can input data into a model using any techniques described in connection with the step 604 of the model 600. Historical data of measurements 119 from physical instruments 18 at the plant 10 can include, for example files, scripts, tables or spreadsheets, of data recordings from one or more physical instruments 18. Data can include time stamps and values to track historical trends for each of the physical instruments 18.

At ACT 654, virtual data generator 160 determines data for virtual instruments. A virtual data generator 160 can determine, for example, any number of virtual instruments 165 in a model 135. Virtual data generator 160 can identify or determine locations for the virtual instruments 165. Virtual data generator 160 can determine virtual instrumentation data 170 for virtual instruments 165 based on the rules on asset interactions from the rules engine 140, or based on user's selections. Virtual data generator 160 can determine virtual instrumentation data 170 for virtual instruments 165 based on the model 135, including for example all of the layers 122-128 and the corresponding data 112-118 on which they are based.

At ACT 656, a simulator 145 simulates the model 135. The simulator 145 can simulate the model 135 based on historical measurements 119. The simulator 145 can simulate the model based on the real-time received data. The simulator 145 can simulate the model using virtual instrumentation 165 and its virtual data measurements 170. The simulator 145 can generate an estimate of future performance of the model 135. The simulator 145 can determine the estimate of future performance using any techniques or steps described in step 618 of the method 600.

At ACT 658, data processing system 100 receives an updated data on the assets. Updated data can include, for example, fresh set of readings or measurements from physical instruments 18 at the plant 10. Updated data can include, for example, real-time measurements 119 streamed over a network 101. Updated or real-time measurements 119 can include any measurements 119 or their features as in step 652, except that the data is updated and more recent. Updated data on the assets can include one or more new replacement assets to replace one or more of the old assets. The new replacement assets can include, for example, updated performance characteristics, throughput, efficiency and power consumption.

At ACT 660, data processing system 100 determines updated virtual instrumentation data 170. Virtual data generator 160 can determine updated virtual instrumentation data 170 based on the updated data or real-time measurements 119. Virtual data generator 160 can, for example, recalculate the functions and calculations for virtual instruments 165 using the updated measurements 119 to determine updated virtual instrumentation data 170.

At ACT 665, simulator 145 simulates the model of the plant 10 based on updated data or real-time measurements and based on updated data for virtual instruments. The model generator 130 can rerun the model based on the updated/real-time measurements 119, and the simulator 145 can rerun the simulation of the updated model 135. The simulator can rerun the updated model 135 using the updated virtual instrumentation data 170. The simulator 145 can estimate the future performance of the model 135 using replacement assets 12 instead of one or more original assets to determine the different in the performance using the new replacement assets. The simulator 145 can then determine the actual difference in performance between the new updated model that uses replacement assets and the old model that used the original assets.

At the end of step 662, the method 650 can go back again to ACT 658, forming a continuous loop between steps 658 and 662 to provide for a digital twin model that continuously updates its model, based on the updated new data, including the new real-time, or periodically updated, physical measurements 119 and their corresponding virtual instrumentation data 170.

With respect to an implementation of the methods 600 and 650, the present solution is directed to a method of modeling a plant. The methods 600 or 650 can include receiving, by a data processing system having at least one processor and coupled with memory, one or measurements from one or more physical instruments located at a plant comprising a plurality of assets that perform one or more functions at the plant. The methods 600 or 650 can include identifying, by the data processing system, a virtual instrument for a location at the plant that lacks a physical instrument at the location. The methods 600 or 650 can include determining, by the data processing system, based on a set of relationships on interactions between the plurality of assets and the one or more measurements input into a model constructed with a plurality of layers corresponding to: i) the plurality of assets at the plant; ii) a topology of the plurality of assets; iii) connections and flow path of the plurality of assets; and iv) the one or more physical instruments at the plant, a virtual measurement for the virtual instrument. The methods 600 or 650 can include generating, by the data processing system responsive to a comparison of the virtual measurement with a threshold, a notification to service at least one of the plurality of assets.

The methods 600 or 650 can include performing, by the data processing system, a simulation of the plant based on the set of relationships applied to the plurality of assets in the model, the one or more measurements and the virtual measurement, and generating, by the data processing system, the notification in response to the simulation.

The methods 600 or 650 can include determining, by the data processing system, the threshold based on an estimate of utilization of a resource from continued performance of at least a first asset of the plurality of assets without servicing the first asset.

The methods 600 or 650 can include receiving, by the data processing system, the one or more measurements from a first physical instrument of the one or more physical instruments located at or within a threshold distance from a first asset of the plurality of assets. The methods 600 or 650 can include determining, by the data processing system based on the set of relationships and the one or more measurements input into the model, the virtual measurement for the virtual instrument located at or within the threshold distance from a second asset of the plurality of assets. The method can include generating, by the data processing system, the notification to service the second asset based on determining.

The methods 600 or 650 can include receiving, by the data processing system, the one or more measurements from a first physical instrument of the one or more physical instruments located at a first location at or within a threshold distance from a first asset of the plurality of assets. The method can include determining, by the data processing system based on the set of relationships and the one or more measurements input into the model, the virtual measurement for the virtual instrument located at a second location at or within the threshold distance from the first asset. The method can include generating, by the data processing system, the notification to service the first asset based on determining.

The methods 600 or 650 can include receiving, by the data processing system, the one or more measurements from a first physical instrument of the one or more physical instruments located at a first location at or within a threshold distance a first asset of the plurality of assets. The methods 600 or 650 can include determining, by the data processing system based on the set of relationships and the one or more measurements input into the model, the virtual measurement for the virtual instrument located at a second location at or within the threshold distance the first asset. The methods 600 or 650 can include generating, by the data processing system, the notification to service a second asset of the plurality of assets based on determining.

The methods 600 or 650 can include constructing, by the data processing system, a first layer of the plurality of layers based on data on the plurality of assets at the plant, a second layer of the plurality of layers based on data on the topology of the plurality of assets at the plant, a third layer of the plurality of layers based on data on connections and flow path of the plurality of assets at the plant, and a fourth layer of the plurality of layers based on data on the one or more physical instruments at the plant. The methods 600 or 650 can include generating, by the data processing system, a display of the model comprising the first layer, the second layer, the third layer and the fourth layer.

The methods 600 or 650 of the present solution can include receiving, by the data processing system, the one or more measurements of at least one of a flow rate of fluid, a salinity of fluid or a fluid temperature at or within a threshold distance from a first asset of the plurality of assets. The methods 600 or 650 can include determining, by the data processing system based on the set of relationships and the one or more measurements input into the model, the virtual measurement of at least one of the flow rate of fluid, the salinity of fluid or the fluid temperature at or within the threshold distance from the first asset or at or within the threshold distance from a second asset of the plurality of assets.

The methods 600 or 650 of the present solution can include performing, by the data processing system, a simulation of a fluid processing plant based on the model, the set of relationships, the one or more measurements and the virtual measurement. The method can include generating, by the data processing system responsive to the simulation, the notification on efficiency of performance of the first asset or the second asset.

The methods 600 or 650 of the present solution can include receiving, by the data processing system, second one or more measurements for a second one or more physical instruments located at a second plant comprising a second plurality of assets. The methods 600 or 650 can include determining, by the data processing system based on a second set of relationships on interactions between the second plurality of assets, a second virtual measurement for a second virtual sensor located at the second plant.

FIG. 7 is a block diagram of an example computer system 700. The computer system or computing device 700 can include or be used to implement the data processing system 100, or its components such as the model generator 130, plant database 110, virtual data generator 160, simulator 145, interface 15, resource utilization monitor 150 and alert generator 155. The computing system 700 includes a bus 705 or other communication component for communicating information and a processor 710 or processing circuit coupled to the bus 705 for processing information. The computing system 700 can include one or more processors 710 or processing circuits coupled to the bus for processing information. The computing system 700 can include memory such as main memory 715, such as a random access memory (RAM) or other dynamic storage device, coupled to the bus 705 for storing information, and instructions to be executed by the processor 710. The main memory 715 can be or include the plant database 110 or model generator 130 including any number of models 135. The main memory 715 can also be used for storing position information, temporary variables, or other intermediate information during execution of instructions by the processor 710. The computing system 700 can include a read only memory (ROM) 720 or other static storage device coupled to the bus 705 for storing static information and instructions for the processor 710. A storage device 725, such as a solid state device, magnetic disk or optical disk, can be coupled to the bus 705 to persistently store information and instructions. The storage device 725 can include or be part of the plant database 110.

The computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information and command selections to the processor 710. The input device 730 can include a touch screen display 735. The input device 730 can also include a cursor control, such as a mouse, a trackball, or cursor direction keys, for communicating direction information and command selections to the processor 710 and for controlling cursor movement on the display 735. The display 735 can be part of the data processing system 100, the client device 20 or other component of FIG. 1, for example.

The processes, systems and methods described herein can be implemented by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. Hard-wired circuitry can be used in place of or in combination with software instructions together with the systems and methods described herein. Systems and methods described herein are not limited to any specific combination of hardware circuitry and software.

Although an example computing system has been described in FIG. 7, the subject matter including the operations described in this specification can be implemented in other types of digital electronic circuitry, or in computer software, firmware, or hardware, including the structures disclosed in this specification and their structural equivalents, or in combinations of one or more of them.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, data processing system 100, model generator 130, virtual data generator 160, simulator 145, resource utilization monitor 150 and alert generator 155 as well as all other data processing system 100 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 100 to perform actions by operating on input data and generating output.

The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as data processing system 100 or system 700 can include or be operating on clients and servers. A client and server are generally remote from each other and typically interact through a communication network (e.g., the network 101). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 100 from the client device 10, instruments or sensors 18).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the data processing system 100, the model generator 130, virtual data generator 160, simulator 145, resource utilization monitor 150 or alert generator 155 can be a single component, app, or program, or a logic device having one or more processing circuits, or part of one or more servers of the data processing system 100.

Having now described some illustrative implementations, it is apparent that the foregoing is illustrative and not limiting, having been provided by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system of modeling a plant, comprising:
a data processing system having at least one processor and coupled with memory, to:
receive one or more measurements from one or more physical instruments located at a plant comprising a plurality of assets that perform one or more functions at the plant;
identify a virtual instrument for a location at the plant that lacks a physical instrument at the location;
determine, based on a set of relationships for interactions between the plurality of assets, and based on the one or more measurements input into a model constructed with a plurality of layers corresponding to: i) the plurality of assets at the plant; ii) a topology of the plurality of assets; iii) connections and flow direction of the plurality of assets; and iv) the one or more physical instruments at the plant, a virtual measurement for the virtual instrument; and
generate, responsive to a comparison of the virtual measurement with a threshold, a notification to service at least one of the plurality of assets;
construct a first layer of the plurality of layers based on data on the plurality of assets at the plant;
construct a second layer of the plurality of layers based on data on the topology of the plurality of assets;
construct a third layer of the plurality of layers based on data on the connections and flow path of the plurality of assets;
construct a fourth layer of the plurality of layers based on data on the one or more physical instruments at the plant; and
generate a display of the model comprising the first layer, the second layer, the third layer and the fourth layer.

2. The system of claim 1, comprising the data processing system to:
perform a simulation of the plant based on the set of relationships applied to the plurality of assets in the model, the one or more measurements and the virtual measurement; and
generate the notification in response to the simulation.

3. The system of claim 2, comprising:
the data processing system to determine the threshold based on an estimate of utilization of a resource from continued performance of at least a first asset of the plurality of assets without servicing the first asset.

4. The system of claim 1, comprising the data processing system to:
receive the one or more measurements from a first physical instrument of the one or more physical instruments located at or within a threshold distance of a first asset of the plurality of assets;
determine, based on the set of relationships and the one or more measurements input into the model, the virtual measurement for the virtual instrument located at or within the threshold distance from a second asset of the plurality of assets; and
generate the notification to service the second asset based on determining.

5. The system of claim 1, comprising the data processing system to:
receive the one or more measurements from a first physical instrument of the one or more physical instruments located at a first location at or within a threshold distance from a first asset of the plurality of assets;
determine, based on the set of relationships and the one or more measurements input into the model, the virtual measurement for the virtual instrument located at a second location at or within the threshold distance from the first asset; and
generate the notification to service the first asset based on determining.

6. The system of claim 1, comprising the data processing system to:
receive the one or more measurements from a first physical instrument of the one or more physical instruments located at a first location at or within a threshold distance from a first asset of the plurality of assets;
determine, based on the set of relationships and the one or more measurements input into the model, the virtual measurement for the virtual instrument located at a second location at or within the threshold distance from the first asset; and
generate the notification to service a second asset of the plurality of assets based on determining.

7. The system of claim 1, comprising the data processing system to:
receive the one or more measurements of at least one of a flow rate of fluid, a salinity of fluid or a fluid temperature at or within a threshold distance from a first asset of the plurality of assets; and
determine, based on the set of relationships and the one or more measurements input into the model, the virtual measurement of at least one of the flow rate of fluid, the salinity of fluid or the fluid temperature at or within the threshold distance from the first asset or at or within the threshold distance from a second asset of the plurality of assets.

8. The system of claim 7, comprising the data processing system to:
perform a simulation of a fluid processing plant based on the model, the set of relationships, the one or more measurements and the virtual measurement; and
generate, responsive to the simulation, the notification on efficiency of performance of the first asset or the second asset.

9. The system of claim 1, comprising the data processing system to:
receive, second one or more measurements for a second one or more physical instruments located at a second plant comprising a second plurality of assets; and
determine, based on a second set of relationships on interactions between the second plurality of assets, a second virtual measurement for a second virtual sensor located at the second plant.

10. A method of modeling a plant, comprising:
receiving, by a data processing system having at least one processor and coupled with memory, one or measurements from one or more physical instruments located at a plant comprising a plurality of assets that perform one or more functions at the plant;
identifying, by the data processing system, a virtual instrument for a location at the plant that lacks a physical instrument at the location;
determining, by the data processing system, based on a set of relationships on interactions between the plurality of assets and the one or more measurements input into a model constructed with a plurality of layers corresponding to: i) the plurality of assets at the plant; ii) a topology of the plurality of assets; iii) connections and flow path of the plurality of assets; and iv) the one or more physical instruments at the plant, a virtual measurement for the virtual instrument; and generating, by the data processing system responsive to a comparison of the virtual measurement with a threshold, a notification to service at least one of the plurality of assets;

constructing, by the data processing system, a first layer of the plurality of layers based on data on the plurality of assets at the plant, a second layer of the plurality of layers based on data on the topology of the plurality of assets, a third layer of the plurality of layers based on data on the connections and flow path of the plurality of assets, and a fourth layer of the plurality of layers based on data on the one or more physical instruments at the plant; and generating, by the data processing system, a display of the model comprising the first layer, the second layer, the third layer and the fourth layer.

11. The method of claim 10, comprising:

performing, by the data processing system, a simulation of the plant based on the set of relationships applied to the plurality of assets in the model, the one or more measurements and the virtual measurement; and generating, by the data processing system, the notification in response to the simulation.

12. The method of claim 11, comprising:

determining, by the data processing system, the threshold based on an estimate of utilization of a resource from continued performance of at least a first asset of the plurality of assets without servicing the first asset.

13. The method of claim 10, comprising:

receiving, by the data processing system, the one or more measurements from a first physical instrument of the one or more physical instruments located at or within a threshold distance from a first asset of the plurality of assets;

determining, by the data processing system based on the set of relationships and the one or more measurements input into the model, the virtual measurement for the virtual instrument located at or within the threshold distance from a second asset of the plurality of assets; and generating, by the data processing system, the notification to service the second asset based on determining.

14. The method of claim 10, comprising:

receiving, by the data processing system, the one or more measurements from a first physical instrument of the one or more physical instruments located at a first location at or within a threshold distance from a first asset of the plurality of assets;

determining, by the data processing system based on the set of relationships and the one or more measurements input into the model, the virtual measurement for the virtual instrument located at a second location at or within the threshold distance from the first asset; and generating, by the data processing system, the notification to service the first asset based on determining.

15. The method of claim 10, comprising:

receiving, by the data processing system, the one or more measurements from a first physical instrument of the one or more physical instruments located at a first location at or within a threshold distance a first asset of the plurality of assets;

determining, by the data processing system based on the set of relationships and the one or more measurements input into the model, the virtual measurement for the virtual instrument located at a second location at or within the threshold distance the first asset; and generating, by the data processing system, the notification to service a second asset of the plurality of assets based on the determining.

16. The method of claim 10, comprising:

receiving, by the data processing system, the one or more measurements of at least one of a flow rate of fluid, a salinity of fluid or a fluid temperature at or within a threshold distance from a first asset of the plurality of assets; and determining, by the data processing system based on the set of relationships and the one or more measurements input into the model, the virtual measurement of at least one of the flow rate of fluid, the salinity of fluid or the fluid temperature at or within the threshold distance from the first asset or at or within the threshold distance from a second asset of the plurality of assets.

17. The method of claim 16, comprising:

performing, by the data processing system, a simulation of a fluid processing plant based on the model, the set of relationships, the one or more measurements and the virtual measurement; and generating, by the data processing system responsive to the simulation, the notification on efficiency of performance of the first asset or the second asset.

18. The method of claim 10, comprising:

receiving, by the data processing system, second one or more measurements for a second one or more physical instruments located at a second plant comprising a second plurality of assets; and determining, by the data processing system based on a second set of relationships on interactions between the second plurality of assets, a second virtual measurement for a second virtual sensor located at the second plant.

* * * * *